US010681060B2

(12) United States Patent
Scheidler et al.

(10) Patent No.: US 10,681,060 B2
(45) Date of Patent: Jun. 9, 2020

(54) COMPUTER-IMPLEMENTED METHOD FOR DETERMINING COMPUTER SYSTEM SECURITY THREATS, SECURITY OPERATIONS CENTER SYSTEM AND COMPUTER PROGRAM PRODUCT

(71) Applicant: BALABIT S.A., Senningerberg (LU)

(72) Inventors: Balazs Scheidler, Senningerberg (LU); Marton Illes, Budapest (HU)

(73) Assignee: BALABIT S.A., Senningerberg (LU)

( * ) Notice: Subject to any disclaimer, the term of this patent is extended or adjusted under 35 U.S.C. 154(b) by 156 days.

(21) Appl. No.: 15/571,934

(22) PCT Filed: Sep. 23, 2015

(86) PCT No.: PCT/EP2015/071866
§ 371 (c)(1),
(2) Date: Nov. 6, 2017

(87) PCT Pub. No.: WO2016/177437
PCT Pub. Date: Nov. 10, 2016

(65) Prior Publication Data
US 2018/0167402 A1     Jun. 14, 2018

Related U.S. Application Data

(60) Provisional application No. 62/157,106, filed on May 5, 2015.

(51) Int. Cl.
*H04L 29/06* (2006.01)
*G06N 20/00* (2019.01)
(Continued)

(52) U.S. Cl.
CPC ........ *H04L 63/1416* (2013.01); *G06F 21/552* (2013.01); *G06F 21/554* (2013.01);
(Continued)

(58) Field of Classification Search
CPC ............ H04L 63/1416; H04L 63/1433; H04L 63/1425; G06N 20/00; G06Q 10/06393;
(Continued)

(56) References Cited

U.S. PATENT DOCUMENTS 8,776,168 B1 *  7/2014  Gibson ................. H04L 63/104
                                                                709/225
9,324,119 B2 *  4/2016  Singh ..................... G06Q 10/06
(Continued)

OTHER PUBLICATIONS

International Search Report, dated Dec. 14, 2015, issued in International Application No. PCT/EP2015/071866.
(Continued)

*Primary Examiner* — Taghi T Arani
*Assistant Examiner* — Badri Narayanan Champakesan
(74) *Attorney, Agent, or Firm* — Maschoff Brennan

(57) ABSTRACT

A computer-implemented method for determining computer system security threats, the computer system including user accounts established on the computer system, the method including the steps of: (i) for a plurality of user accounts, assigning a risk level to each account; (ii) in a time interval, for a plurality of events, wherein each event is linked to a respective user account, assigning an event score relating to deviation from normal behavior of each event with respect to the respective user account; (iii) in the time interval, for the plurality of events, calculating an event importance which is a function of the respective event score and the respective user account risk level; (iv) prioritizing the plurality of events by event importance, and (v) providing a record of the plurality of events, prioritized by event importance.

21 Claims, 18 Drawing Sheets

(51) Int. Cl.
*G06F 21/56* (2013.01)
*G06F 21/57* (2013.01)
*G06F 21/55* (2013.01)
*G06Q 10/06* (2012.01)

(52) U.S. Cl.
CPC .......... *G06F 21/566* (2013.01); *G06F 21/577* (2013.01); *G06N 20/00* (2019.01); *G06Q 10/06393* (2013.01); *H04L 63/1425* (2013.01); *H04L 63/1433* (2013.01)

(58) Field of Classification Search
CPC .... G06F 21/552; G06F 21/577; G06F 21/566; G06F 21/554
USPC .......................................................... 726/23
See application file for complete search history.

(56) References Cited

U.S. PATENT DOCUMENTS

| | | | | |
|---|---|---|---|---|
| 9,558,346 | B1* | 1/2017 | Kolman | G06F 21/50 |
| 9,591,087 | B2* | 3/2017 | Sinha | H04L 67/12 |
| 9,798,883 | B1* | 10/2017 | Gil | G06F 21/577 |
| 9,830,643 | B2* | 11/2017 | Kassaei | G06Q 10/00 |
| 2008/0189788 | A1* | 8/2008 | Bahl | G06F 21/577 |
| | | | | 726/25 |
| 2012/0047575 | A1* | 2/2012 | Baikalov | G06F 21/577 |
| | | | | 726/21 |
| 2013/0097701 | A1* | 4/2013 | Moyle | H04L 63/1441 |
| | | | | 726/22 |
| 2013/0111592 | A1* | 5/2013 | Zhu | G06F 21/577 |
| | | | | 726/25 |
| 2013/0268994 | A1* | 10/2013 | Cooper | H04L 63/10 |
| | | | | 726/1 |
| 2014/0201806 | A1* | 7/2014 | Kumar | H04L 63/1416 |
| | | | | 726/1 |
| 2015/0215332 | A1* | 7/2015 | Curcic | H04L 63/1433 |
| | | | | 726/25 |
| 2016/0094565 | A1* | 3/2016 | Adams | G06F 21/577 |
| | | | | 726/24 |
| 2016/0246966 | A1* | 8/2016 | Batrouni | G06F 21/60 |
| 2017/0076395 | A1* | 3/2017 | Sedlik | G08G 1/096822 |

OTHER PUBLICATIONS

Anonymous, "Shell Control Box 4 ItS Product Description," retrieved from the Internet: URL: https://web.archive.org/web/20150501034631/https://www.balabit.com/documents/pdf/SCB_4LTS_desc_ENG.Pdf [retrieved on Dec. 2, 2015] (May 1, 2015) XP055232881.

* cited by examiner

Blindspotter
- User behavior analytics
- Real-time dashboards
- Priority list
- Zoom function
- Automated response
- Privacy warranty

Shell Control Box
- Independent data source
- Detailed footage
- Control functions

Syslog-ng
- Reliable logging
- Wide range of sources
- High-performance

FIGURE 12

Log message IDs

| Message ID | Type | Explanation | Recommended action | Message location |
|---|---|---|---|---|
| 1 | negative | An error occurred while starting the Blindspotter application. | If the error persists, please contact the support team | ../bsp/core/startup.py:67 |
| 2 | positive | HelloCommand finished | (none) | ../bsp/devaddons/helloworld/hellocmd.py:28 |
| 3 | positive | Hello World test info message | (none) | ../bsp/devaddons/helloworld/__init__.py:29 |
| 4 | positive | An info about successful authorization | (none) | ../bsp/web/login.py:29 |
| 5 | negative | An unknown user attempted authentication | Check if the username is mistyped. | ../bsp/core/authenticate.py:26 |
| 6 | negative | A bad password was specified for authentication. | Check if the password is mistyped. | ../bsp/core/authenticate.py:32 |
| 7 | negative | A user has attempted to use a site which she is not permitted to use. | Check if appropriate permissions were granted. | ../bsp/core/authenticate.py:39 |
| 8 | positive | A baselinebuilding process has finished, you can see the number of successful and failed baselinebuild. | (none) | ../bsp/core/algo/trainingreporter.py:31 |
| 9 | positive | Activity closed and marked as interesting. | (none) | ../bsp/addons/rest/rest.py:97 |
| 10 | positive | Activity closed and marked as not interesting. | (none) | ../bsp/addons/rest/rest.py:100 |
| 11 | positive | An activity reopened | (none) | ../bsp/addons/rest/rest.py:93 |
| 12 | negative | Activity lacks user risk value | (none) | ../bsp/core/scoreaggregator.py:102 |
| 14 | negative | This means that an error occurred, while the server tried to add a new activity | If the error persists, you should check the data you tried to add. | ../bsp/core/activityingestion/activityingestion.py:80 |
| 15 | negative | This message shows you, that the SCB fetcher does not validate the SSL certificate for the SCB. | You should export the scb CA certificate and provide the filename in the site-config for increase security. | ../bsp/addons/scbfetcher/backends/scbsoapbackend/sudshttptransport.py:25 |
| 16 | negative | An empty row is detected in input stream. It is unnecessary, so you should pay attention to avoid the empty rows. | (none) | ../bsp/addons/jsonimport/jsonimport.py:63 |

FIGURE 13

```
bsp/browser
├── activities
│   ├── activity-controller.js      // (other component)
│   ├── activity.html               // (non js file)
│   ├── activity.js                 // (module)
│   └── tests
│       └── test-activity.js
├── components
│   ├── daterange
│   │   ├── daterange.js
│   │   ├── daterange-service.js
│   │   └── tests
│   │       └── test-daterange.js
│   ├── resources
│   │   ├── activities-service.js
│   │   ├── hosts-service.js
│   │   ├── resources.js
│   │   └── users-service.js
│   └── utils
│       ├── utils.js
│       └── utils-service.js
├── dashboard
│   ├── dashboard-controller.js
│   ├── dashboard.html
│   ├── dashboard.js
│   └── tests
│       └── test-dashboard.js
├── index.html
├── bsp.js
└── tests
    ├── rendereddirective.js
    └── renderedpagewithcontroller.js
```

FIGURE 15

COMPUTER-IMPLEMENTED METHOD FOR DETERMINING COMPUTER SYSTEM SECURITY THREATS, SECURITY OPERATIONS CENTER SYSTEM AND COMPUTER PROGRAM PRODUCT

CROSS REFERENCE TO RELATED APPLICATIONS

This application claims the priority of PCT/EP2015/071866, filed on Sep. 23, 2015, which claims the benefit of priority to U.S. Provisional Application No. 62/157,106, filed on May 5, 2015, the entire contents of which are fully incorporated herein by reference.

BACKGROUND OF THE INVENTION

1. Field of the Invention

The field of the invention relates to computer-implemented methods for determining computer system aspects, especially security threats; to related systems, especially to security operations center systems, and to related computer program products.

2. Technical Background

Many companies' worst nightmare is already lurking inside what was previously thought to be its perimeter, a sophisticated external attacker or malicious insider. Nowadays, attackers are intelligent, well-funded and their attacks are increasingly complex and well targeted. The common theme of recent, high-profile breaches is that they were carefully planned and went undetected for some time with the attackers moving freely inside the victim's information technology (IT) environment. Malicious insiders hold an advantage over a company's primary security tools in that they are designed to protect against external threats, not against trusted employees. Targeted attacks by humans use a combination of IT vulnerabilities, social engineering and ordinary crime to gain unauthorized access. It means that the new perimeter, where you have to focus, is your users. They should be the new focus of your security measures instead of the infrastructure.

3. Discussion of Related Art

EP1741223(A2) and EP1741223B1 disclose a method, apparatus and computer program for distinguishing relevant network security threats using comparison of refined intrusion detection audits and intelligent security analysis. EP1741223(A2) and EP1741223B1 disclose an apparatus, a method, and a computer program are provided for distinguishing relevant security threats, and that with conventional computer systems, distinguishing security threats from actual security threats is a complex and difficult task because of the general inability to quantify a "threat", and that by the use of an intelligent conceptual clustering technique, threats can be accurately distinguished from benign behaviors, and that thus, electronic commerce, and Information Technology systems generally, can be made safer without sacrificing efficiency. EP1741223(A2) and EP1741223B1 disclose prior art FIG. 18 in which the reference numeral 300 generally designates a flow chart depicting the method of distinguishing relevant security threats, in step 301, the network intrusion detection devices are audited, in step 302, the network intrusion reports are retrieved, in step 303, 304, and 305, the network intrusion report and the threat assessment are compared, and in steps 306, 307, and 308, the semantic clustering is refined.

However, a system that focuses on more effective identification of intrusive network security threats may be comparatively ineffective at identifying malicious behavior by users of user accounts with high access privileges, for example.

SUMMARY OF THE INVENTION

According to a first aspect of the invention, there is provided a computer-implemented method for determining computer system security threats, the computer system including user accounts established on the computer system, the method including the steps of:

(i) for a plurality of user accounts, assigning a risk level to each account;

(ii) in a time interval, for a plurality of events, wherein each event is linked to a respective user account, assigning an event score relating to deviation from normal behavior of each event with respect to the respective user account;

(iii) in the time interval, for the plurality of events, calculating an event importance which is a function of the respective event score and the respective user account risk level;

(iv) prioritizing the plurality of events by event importance, and (v) providing a record of the plurality of events, prioritized by event importance.

An advantage is that a record of important events is provided in which events are prioritized so that more important events may be investigated more quickly and efficiently, which improves the security of an organization which is protected by the method; the method especially improves the security of the organization against those inside the organization with a high degree of control of the organization's computer systems, for example.

The method may be one including the step of using a calculated event importance of an event linked to a user account to adjust the risk level of the user account. An advantage is that a user with risky behavior is monitored more closely.

The method may be one including the step of assigning an initial risk level for each user account based on the permissions of the user account. An advantage is that those inside the organization with a high degree of control of the organization's computer systems are monitored more closely as soon as the method is put into effect.

The method may be one wherein risk levels and event scores are normalized.

The method may be one wherein the risk level of a user account is calculated based on one or more of: user risky behavior, human resources information for the user, social media activity of the user, bad behavior patterns of the user, or financial information of the user. An advantage is that risky users are monitored more closely.

The method may be one wherein risky behavior relating to a user account temporarily increases the risk level of the user account. An advantage is that short-lived risky behavior alone does not drain resources in the long term.

The method may be one wherein all user account activity, including malicious events, occurring throughout IT systems is analysed. An advantage is a very comprehensive protection.

The method may be one wherein normal behavior of each event with respect to the respective user account is determined with respect to a baseline. An advantage is that differences to normal behavior can be used to detect important events efficiently.

The method may be one wherein a baseline is built using algorithms which use historical data on user behavior.

The method may be one wherein algorithms build baseline data for hosts and for user groups.

The method may be one wherein baselines are usable to identify similarly behaving users/hosts or similar activities.

The method may be one wherein an algorithm learns about typical login-times.

The method may be one wherein an algorithm identifies logins at unusual times. An advantage is efficient detection of important events, that is calibrated to typical user activity.

The method may be one wherein an algorithm identifies unusual combinations of user activity properties.

The method may be one wherein deviation from normal behavior is analysed by integrating a variety of contextual information in addition to standard log data, and processing with algorithms.

The method may be one wherein user behavior profiles are created and are continually adjusted using machine learning. An advantage is highly automated efficient detection of important events.

The method may be one wherein machine learning is used instead of predefined patterns. An advantage is automatic adaptation to the normal behaviours in the system, for improved efficiency of detection of important events.

The method may be one wherein analysis of deviation from normal behavior does not require pre-defined correlation rules.

The method may be one wherein user account activity is tracked and visualized in real-time.

The method may be one including the step of providing a warning and an automatic intervention in response to an event importance above a threshold level being calculated.

The method may be one wherein user account activities are scored by multiple different algorithms on how usual or unusual they are.

The method may be one wherein event importance= $[[\{account\ risk\}^\wedge + \{event\ score\}^\wedge 2]/2]^\wedge(1/2)$.

The method may be one wherein built-in algorithms have parameters that allow to fine-tune the output.

The method may be one wherein data is analyzed in multiple ways to adjust the risk and deviation level event score of each activity.

The method may be one including the step of providing a web-based user interface in which activities, hosts, and user accounts may be checked and in which results are made available.

The method may be one including the step of presenting a user interface in which events are presented and ranked by their security risk importance.

The method may be one including the step of presenting a user interface in which user accounts are presented and ranked by their highest event security risk importance.

The method may be one including the step of presenting a user interface in which remote IP addresses are presented and ranked by their highest event security risk importance.

The method may be one including the step of presenting histograms, distributions, baseline visualisation for peer groups and for an entire company based on typical behavior.

The method may be one including the step of presenting the behaviour of an individual or group of individuals above the typical behaviour as a background.

The method may be one including the step of building a unique profile of individual users with cooperation of a Shell Control Box (SCB) which records all user activity at an application layer.

The method may be one in which SCB has information on user sessions and meta information on connections and details of user activities in the sessions.

The method may be one wherein a database holds all user, host, activity and baseline data.

The method may be one wherein a host of the database is separate from fetchers, algorithms and a user interface.

The method may be one wherein the database includes CouchDB and Postgres.

The method may be one wherein algorithms are responsible for scoring activities in user accounts.

The method may be one including the step of automatically grouping users and/or hosts based on their attributes or activities.

The method may be one wherein event importance results are exportable automatically to Security Information and Event Management or as alerts and notifications.

The method may be one wherein data may be accessed using a Representational State Transfer (REST) application programming interface (API) for integration into existing monitoring infrastructure.

The method may be one including the step of analyzing application logs and other sources to find anomalies and suspicious activity.

The method may be one including the step of automatically disabling a user account in response when an anomaly is detected.

The method may be one including the step of starting session recording as an automatic response when an anomaly is detected.

The method may be one including the step of supporting ticketing & work-flow management to handle spotted anomalies.

The method may be one including the step of the system sending an alert to a Security Operation Center for further investigation in response to an event importance being above a threshold.

The method may be one including the step of the system sending prioritized alerts to a Security Operation Center for further investigation in response to a plurality of event importances being above a threshold.

The method may be one including the step of the system asking confirmation from the user before executing the action initiated by the user in response to an event score being above a threshold.

The method may be one including focusing on successful logins using user accounts.

The method may be one including multiple algorithms being applied to data, including two or more of: time distributions; association rule learning; recommender systems; text analysis.

The method may be one including the steps of high quality monitoring which produces intelligent data analysis, which produces real time reaction, which in turn produces high quality monitoring.

The method may be one including the step of collecting information on user account activities.

The method may be one including the step of profiling user account behavior.

The method may be one wherein the system gets data from other systems including Logs, audit-trails, and information on user activities.

The method may be one including the system using at least two data sources, including Contextual information sources and raw user activity data sources.

The method may be one wherein contextual information sources are one or more of: Information on users, hosts, but not actual activities.

The method may be one wherein contextual information sources are one or more of: Active Directory (AD), Lightweight Directory Access Protocol (LDAP), human resources (HR)-system, IT-asset database (DB).

The method may be one wherein raw user activity data sources include one or more of: logs, SSB/syslog-ng/SIEM logs, SCB logs, databases logs, csv files logs, and application data through application programming interfaces.

The method may be one wherein the system does not store data for long term.

The method may be one wherein to be able to detect events, the system can obtain related information from unknown, unstructured data (e.g. log with unknown format).

The method may be one wherein the system uses heuristics based on pattern matching algorithms to identify events related to its operating domain, bind them to users, classify them and score their risk.

The method may be one wherein not all user accounts are equal.

The method may be one wherein more privileged user accounts are more risky.

The method may be one including a step in which riskier user accounts are monitored more closely.

The method may be one wherein peer-groups are defined for comparing behavior profiles.

The method may be one wherein the system protects personal data by limiting who can access it, and under what circumstances.

The method may be one wherein functionality may be implemented through add-ons.

The method may be one wherein fetchers are responsible for getting data and providing a unified view of the data.

The method may be one wherein fetchers, algorithms, exports, automatic-responses, visualization, database layer are all add-ons.

The method may be one wherein activity data may be categorized or tagged to describe the type of activity it represents.

The method may be one wherein logs are pulled by fetchers or pushed by apps.

The method may be one wherein fetchers can select which logs messages are considered as user activities.

The method may be one wherein logs are used for specific user groups.

The method may be one wherein logs are used for a user above a predetermined risk level.

The method may be one wherein specific patterns are extracted from logs.

The method may be one wherein historical data is used to build a user baseline without a learning period.

The method may be one wherein in categorization and risk scoring of events, different time zones under which the users and applications are operating are taken into consideration.

The method may be one including the step of pseudonymizing user profiles such that early phases of investigations are conductable against a pseudonym without identifying the human behind it.

The method may be one wherein control of de-pseudonymisation uses an approval method.

The method may be one including the step of determining which individual is using a specific user account based on behaviour and/or other contextual information.

The method may help companies to focus their security resources on important events.

The method may be one wherein the method significantly decreases the processing and storage costs associated with handling logs generated by IT infrastructure by prioritizing the logs according to their importance.

The method may be one wherein the method reduces the workload for an IT security team.

According to a second aspect of the invention, there is provided a security operations center system including a processor, the processor programmed to execute a computer-implemented method for determining computer system security threats, the computer system including user accounts established on the computer system, wherein data relating to the user accounts is accessible to the processor, the processor programmed to:

(i) for a plurality of user accounts, assign a risk level to each account;

(ii) in a time interval, for a plurality of events, wherein each event is linked to a respective user account, assign an event score relating to deviation from normal behavior of each event with respect to the respective user account;

(iii) in the time interval, for the plurality of events, calculate an event importance which is a function of the respective event score and the respective user account risk level;

(iv) prioritize the plurality of events by event importance, and (v) provide a record of the plurality of events, prioritized by event importance.

An advantage is that a record of important events is provided in which events are prioritized so that more important events may be investigated more quickly and efficiently, which improves the security of an organization which is protected by the security operations center system, especially against those inside the organization with a high degree of control of the organization's computer systems.

The security operations center system may be one wherein the security operations center system is provided as a platform product.

The security operations center system may be one wherein the system provides a command line interface for managing system installation and running maintenance jobs.

The security operations center system may be one wherein Behavior Analysis as a Service (BaaaS) is provided, wherein Cloud offering of the system is provided for customers who do not want to use an on-premise installation.

The security operations center system may be one wherein through cloud integration the system is usable to compare user activities & analytics with other organizations baselines.

The security operations center system may be one wherein shared information includes one or more of: User risk histogram, algorithm parameters, algorithm weights, activity numbers, average baseline, baseline outliers, min/max/average/stddev score given by algorithms/baselines, false-negative activities with baselines, anonymous clusters.

The security operations center system may be one wherein one installation of the system can serve multiple customers, wherein Database, configuration, and user interface are all separated between instances.

The security operations center system may be one wherein the system is installed on a Linux system, including database servers, web-server, Initial data import, and automatic job setup.

The security operations center system may be one wherein the system can load historical data from data sources.

The security operations center system may be one configured to perform a method according to any aspect according to the first aspect of the invention.

According to a third aspect of the invention, there is provided a computer program product executable on a processor to perform a computer-implemented method for determining computer system security threats, the computer system including user accounts established on the computer system, wherein data relating to the user accounts is accessible to the processor, the computer program product executable to:

(i) for a plurality of user accounts, assign a risk level to each account;

(ii) in a time interval, for a plurality of events, wherein each event is linked to a respective user account, assign an event score relating to deviation from normal behavior of each event with respect to the respective user account;

(iii) in the time interval, for the plurality of events, calculate an event importance which is a function of the respective event score and the respective user account risk level;

(iv) prioritize the plurality of events by event importance, and (v) provide a record of the plurality of events, prioritized by event importance.

The computer program product may be configured to perform a method of any of aspect according to the first aspect of the invention.

Further aspects of the invention are defined in Claims 94 to 151.

BRIEF DESCRIPTION OF THE FIGURES

Aspects of the invention will now be described, by way of example(s), with reference to the following Figures, in which:

FIG. 12 shows an example of aspects of a contextual security intelligence system.

FIG. 13 shows examples of Log message IDs.

FIG. 15 shows an example directory structure.

DETAILED DESCRIPTION

Figure 1:
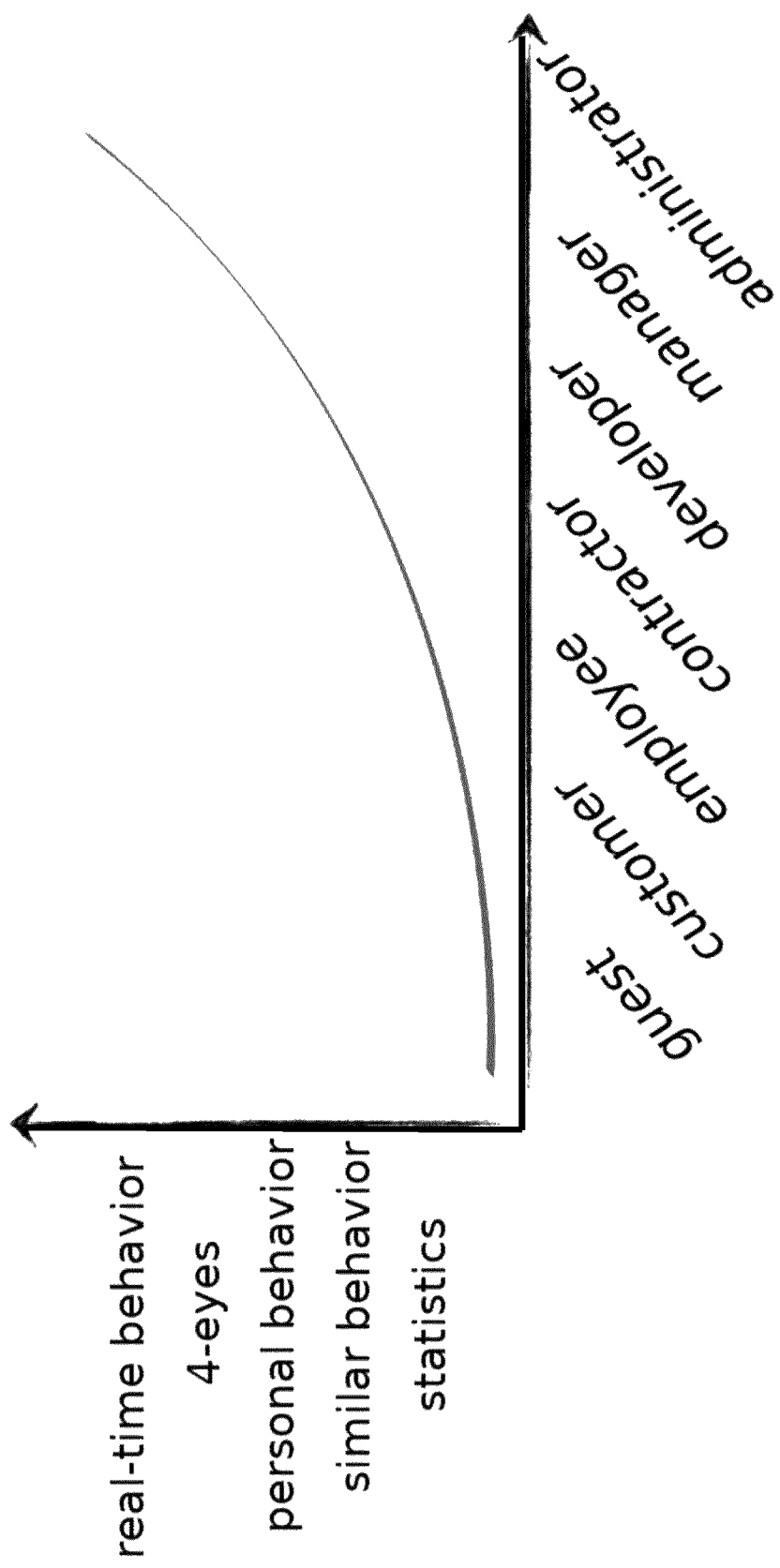
FIG. 1 shows an example schematic user risk diagram.

We describe an information technology (IT) security tool that, for example, analyzes all user activity, including malicious events, occurring throughout IT systems. By detecting deviations from normal behavior and assigning a risk value, it helps companies focus their security resources on important events and also allows them to replace some controls, yielding greater business efficiency. Adding more tools that restrict users won't make your company safer, it will just make your employees less productive.

Blindspotter integrates a variety of contextual information in addition to standard log data, processes them using unique sets of algorithms, and generates user behavior profiles that are continually adjusting using machine learning. It tracks and visualizes user activity in real-time for a better understanding of what is really happening on the network and offers a wide range of outputs from warnings to automatic interventions. It doesn't require pre-defined correlation rules; it simply works with your existing data. The built-in algorithms have standard and unique parameters that allow you to fine-tune the output without being a skilled data scientist. Data is analyzed in multiple ways to adjust the risk and deviation level of each activity. Blindspotter reveals all new deviations from normal operation in a well-prioritized dashboard. With advanced monitoring across every aspect of an IT system, Blindspotter prevents sensitive and critical data from potential security breaches, from both internal and external attackers.

In an example, a user interface is presented in which events are presented and ranked by their security risk importance. In an example, a user interface is presented in which user accounts are presented and ranked by their highest event security risk importance. In an example, a user interface is presented in which remote IP addresses are presented and ranked by their highest event security risk importance.

Blindspotter is able to maximize the benefit of logs with syslog-ng and builds a unique profile of individual users with cooperation of Shell Control Box (SCB) which records all user activity at the application layer. (Shell Control Box (SCB) is a device for controlling and monitoring administrative protocols used for remote access or management in computer technology.) With these two world-class monitoring tools, Blindspotter gives you a deeper understanding of your users than any other solution. The solution delivers an extremely comprehensive security analytics portfolio which gives you peace of mind about your IT environment.

Key Benefits
    User focused IT Security
    Easier to find anomalies
    Reduce the workload from IT Security team
    More monitoring less control and hassle for your employees Example Use Cases Detection of Advanced Persistent Threats (APT)

Lowers the impact of potential breaches. Users with stolen credentials behave differently than real users. Blindspotter is able to detect the level of deviation from normal user activity. If the deviation is high, it sends an alert to the Security Operation Center for further investigation. Users with suspicious activity can be involved into the investigation process automatically. It dramatically decreases the false positive alerts.

Log Message Noise Reduction

Significantly decreases the processing and storage costs associated with handling the millions or billions of logs generated by IT infrastructure by prioritizing them according to their importance. This allows customers to optimize their resources. Automatic and daily used scripts (backups, synchronization, etc) need less focus while random or ad-hoc scripts need closer monitoring.

Decrease in the Complexity of Security Controls

Increases the level of security without introducing additional control layers. Using monitoring tools rather than control tools increases employee productivity by allowing employees greater freedom in using applications and devices that help them work more efficiently. Using Blindspotter you can benefit from advanced monitoring tools and it is easier to detect abnormal activities.

Optimization of SIEM (Security Information and Event Management) Alerts

Increases the awareness of security teams, allowing them to see malicious activity happening "under the radar". Most of the SIEMs focus on failed logins while Blindspotter focuses on successful ones. The majority of SIEMs use pre-defined rules for capturing the known issues. Blindspotter analyzes application logs and other sources to find anomalies (a deeper level of understanding of real human activity) and suspicious activity. Blindspotter may send prioritized alerts to extend SIEM functionality.

Blindspotter: People-oriented IT Security
Solution:
   Digital footprints are collected from multiple sources
   Automated, deep data analysis
   Show a prioritized list of the security team
   Involving Users
   The anomalies are the main focus
   Immediate reaction
Data Analysis
   Several algorithms running on the data
      time distribution
      Learning of association rules
      Recommendation systems
      Text Analysis
Data Analysis
   User Feedback
      Locally and globally
      Between algorithms and within algorithms
Main Applications
   Show the user activity Anomalies
   Security experts work to facilitate a prioritized list
   facilitate and optimize the use of SIEM (Security Information and Event Management)
   improve the signal-to-noise ratio
Description
   Typical user behavior and analyzing
Solution: Behavior Intelligence
   Humans are the key. Use Machine learning instead of predefined patterns.
Math Behind the Theory
   Multiple algorithms applied to the data: time distributions; association rule learning; recommender systems; text analysis.

Figure 10:
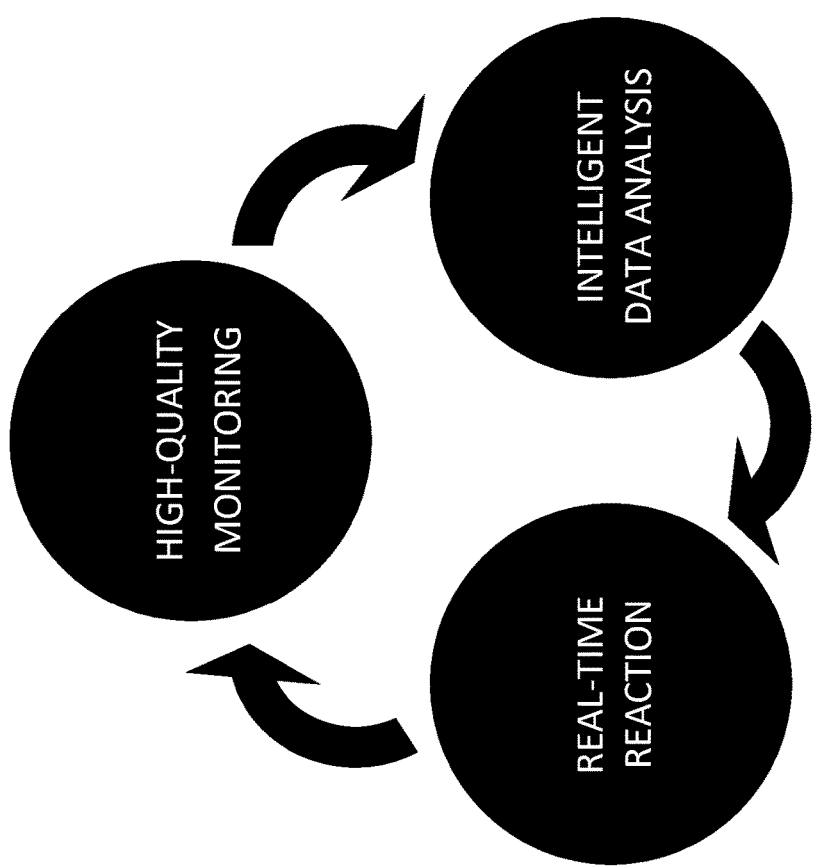
FIG. 10 shows an example of how monitoring complements control.

High quality monitoring produces intelligent data analysis, which produces real time reaction, which in turn produces high quality monitoring. FIG. 10 shows an example of how monitoring complements control.

Figure 11:
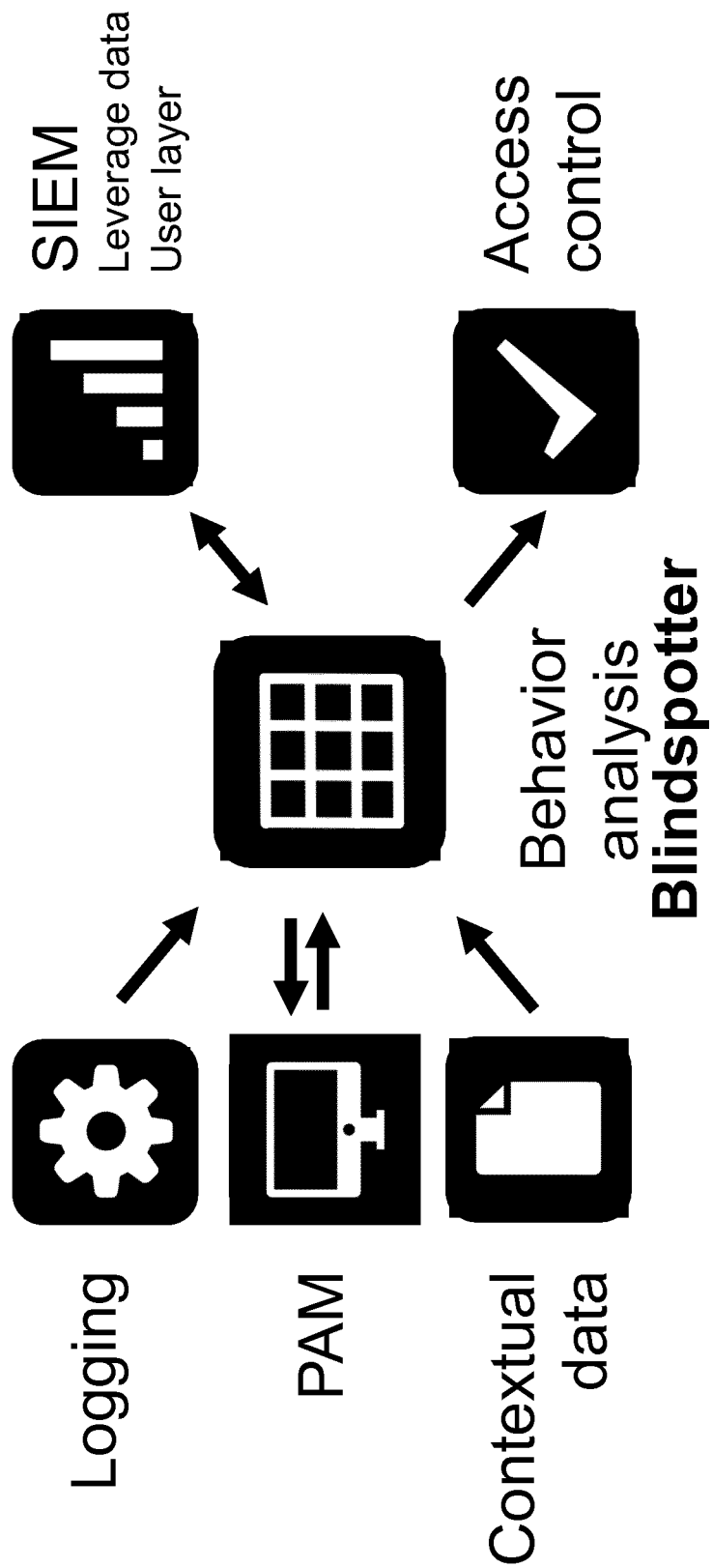
FIG. 11 shows an example of a contextual security intelligence system.

Regarding Privileged Access Management (PAM), this provides deep visibility into the activity, real-time monitoring & control, and privileged accounts require special attention. FIG. 11 shows an example of a contextual security intelligence system.

Regarding User Behaviour Analytics, these provide an automated response, real-time prioritized dashboards, and can show you what's really important. FIG. 12 shows an example of aspects of a contextual security intelligence system.

Key Application Areas
   Highlight anomalies in user behavior
   Give priority list to Security Analysts
   Optimize and extend SIEM usage
   Hide useless information
   Find strange user activity in a peer-group
   Analyze typical user behaviors
Blindspotter Technical Introduction
Agenda
   Overview of Blindspotter (BSP) functions
   Architecture
   Walk-through of BSP components & concepts
Operation: Helicopter View
   Collect information on user activities
   Collect context information on users & systems
      Augment activity information with context details
   Profile user behavior
   Spot anomalies in user activities
      Automatically react on suspicious events
   Provide list of interesting activities
      Actionable insights with context information
Who are the Users of BSP?
   Security team
      Security operations center (SoC) operators: L1 person, handling tickets, alerts
      Security investigator: stronger security skills, like sec. L2
      Security architect: responsible for org. security architecture
      Security operation engineer: responsible for running sec apps
      Chief Information Security Officer (CISO), the boss
   Other stakeholders
      System administrator, operators: not really daily users, but responsible for apps and surrounding infrastructure
      External auditor: want to make sure that everything is compliant
      Worker union representative: concerned about privacy
What May be Monitored by BSP?
   BSP focuses on users and their activities
      BSP can handle only data related to users directly
      Focus on risky users
      No in-direct data
   BSP gets data from other systems
      Logs, audit-trails, anything that has information on user activities
      BSP rely on external sources and does not store data for long term
      Batch, real-time & semi real-time mode data gathering
Who May be Monitored by BSP?
   BSP focuses on risky users
   The main focus may be on privileged users
      Administrators, operators, developers, etc.
      Challenge: monitored users are part of IT team
   Externals accessing corporate IT assets
   High risk users may be business users as well
      Users with access to sensitive IT assets
      Typically no IT users, independent from IT team
User Risk
   Not all users are equal
   More privileged users are more riskier
   Riskier users are monitored much closer An example schematic user risk diagram is shown in FIG. 1.

Figure 2:
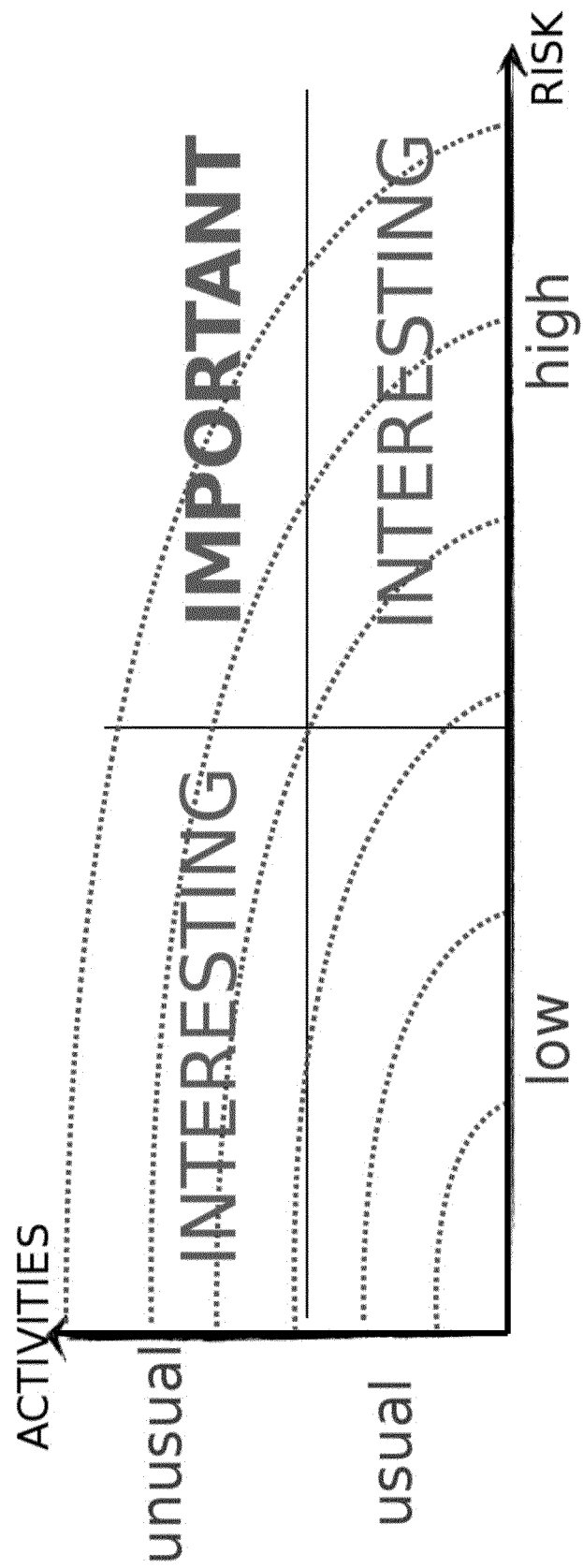
FIG. 2 shows an example schematic activity scoring diagram.
Figure 3:
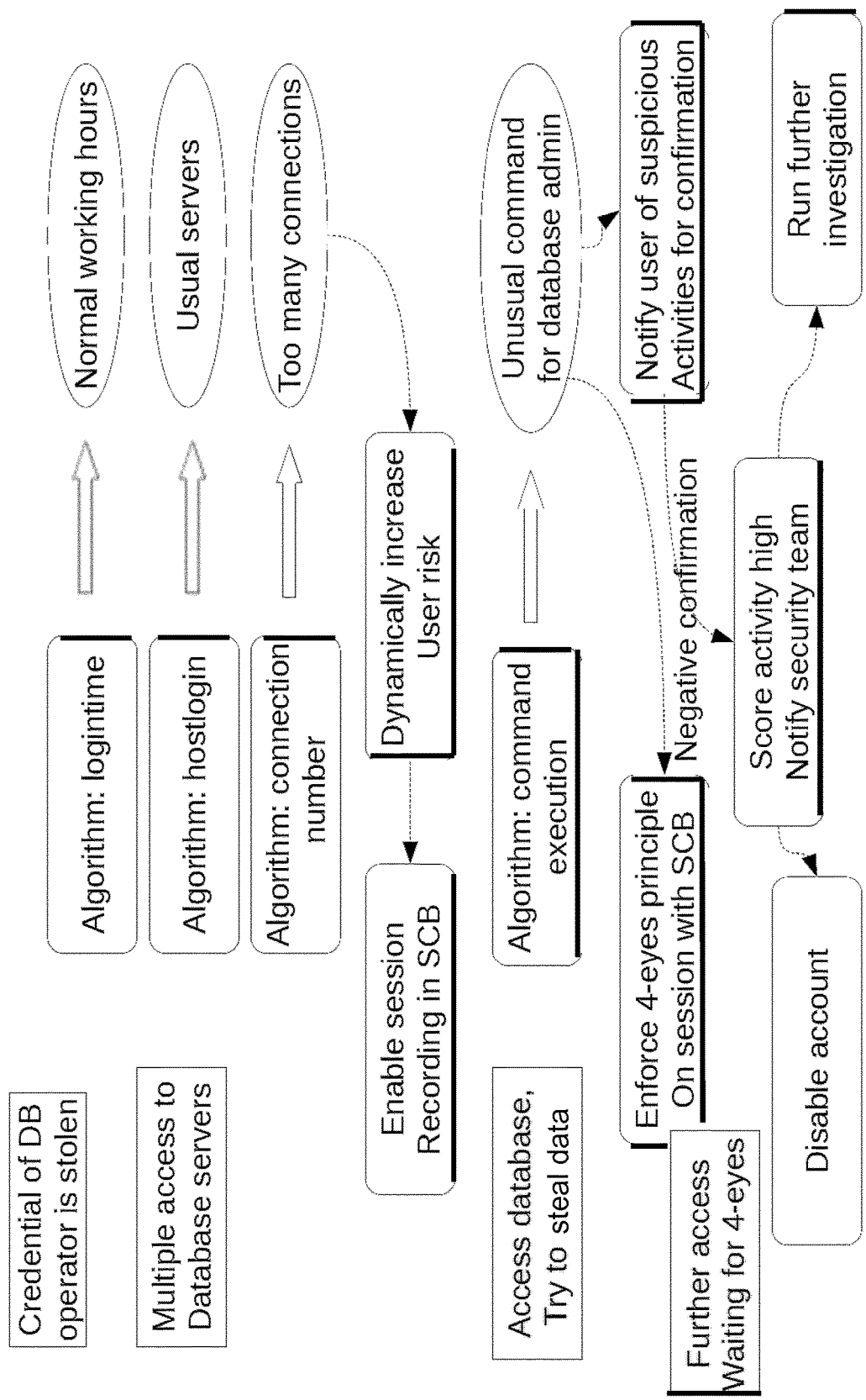
FIG. 3 shows an example of an anatomy of an attack detection.
Figure 4:
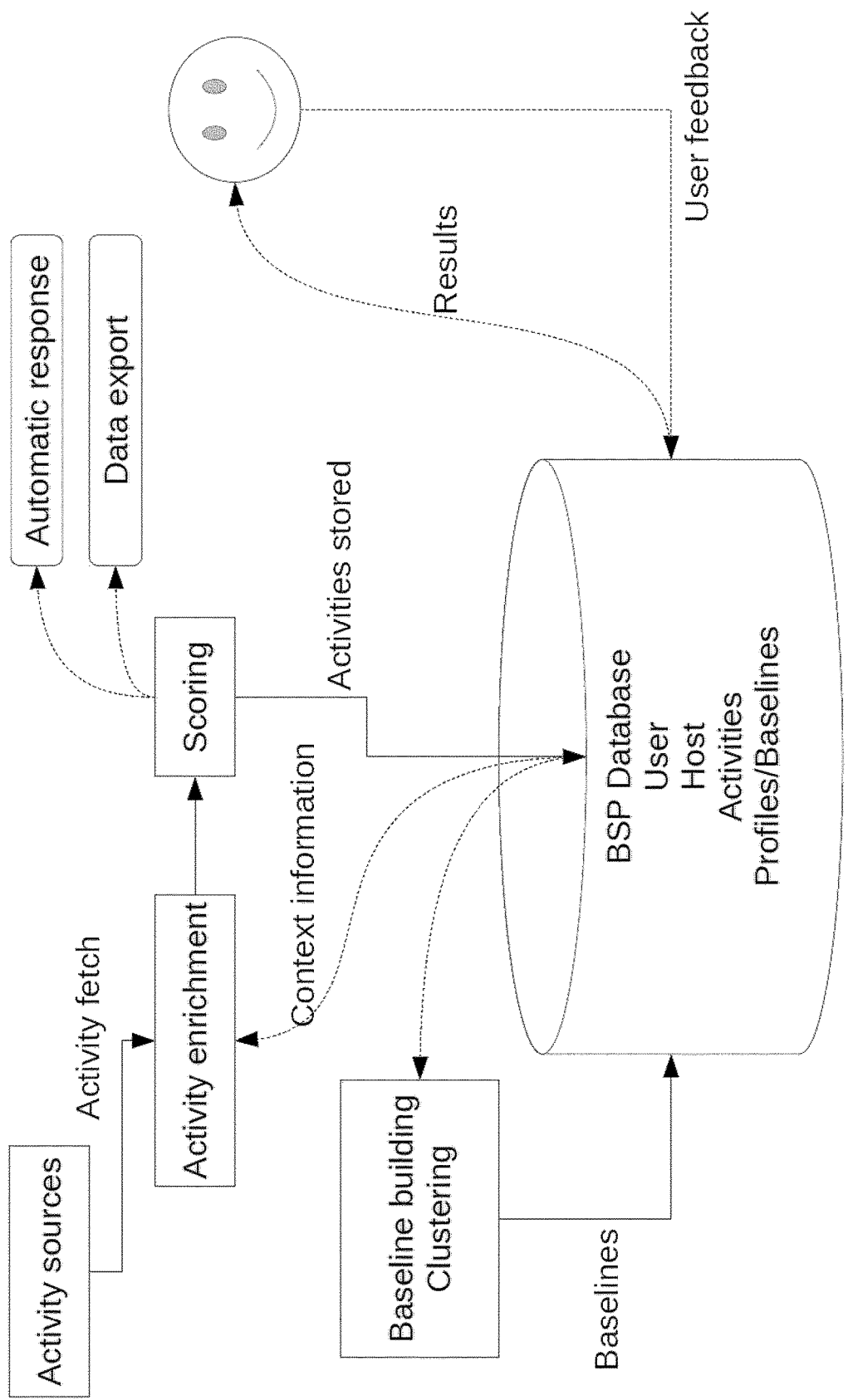
FIG. 4 shows an example of activity data-flow.
Figure 5:
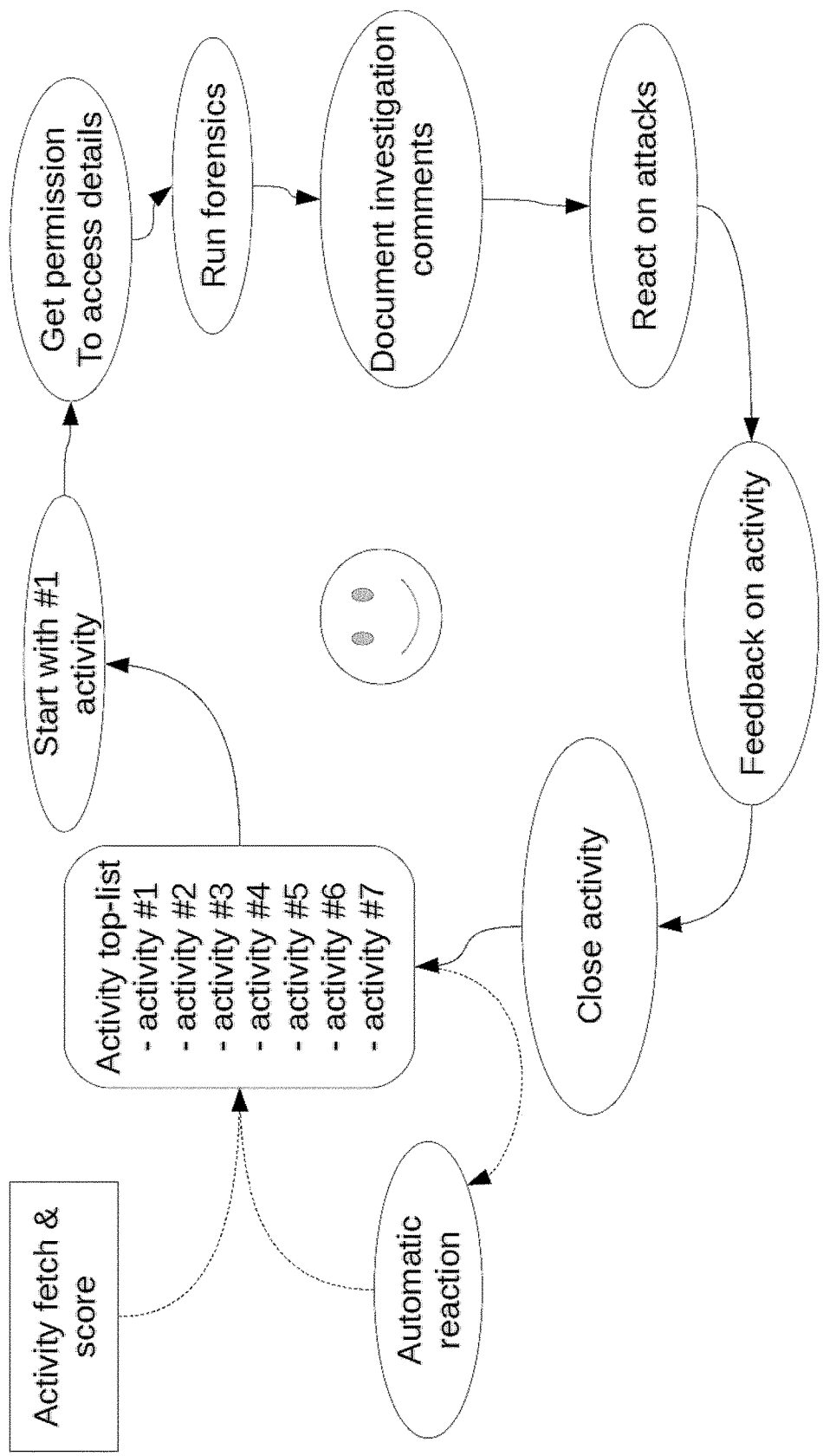
FIG. 5 shows an example of activity work-flow-life-cycle.
Figure 6:
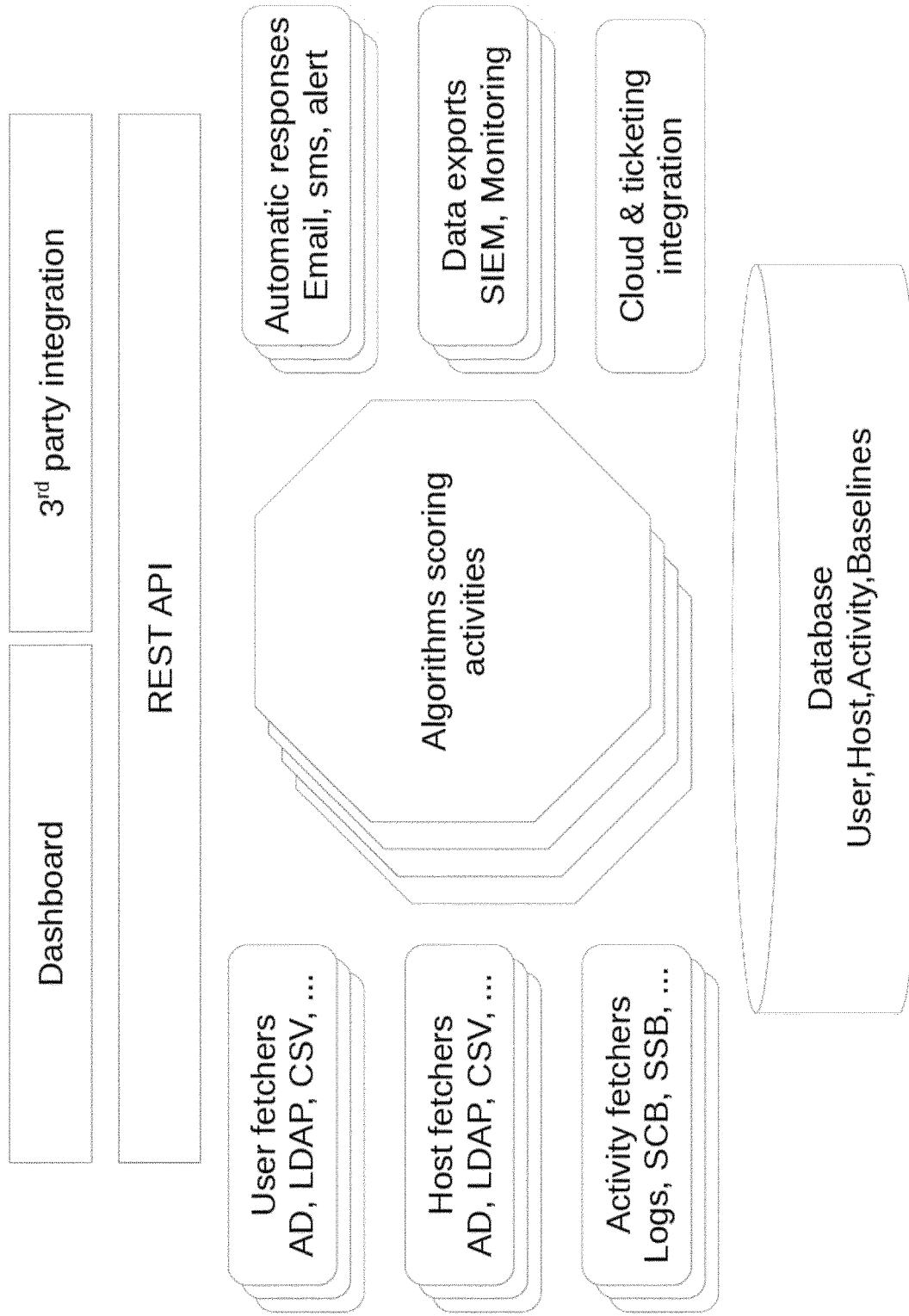
FIG. 6 shows an example of a system architecture.

Activity Scoring
  Activities are scored by multiple different algorithms on how usual or unusual they are
  Unusual activities are important for us
  An example schematic activity scoring diagram is shown in FIG. 2.
Multiple Algorithms, Multiple Parameters
  Why use multiple algorithms?
  Different algorithms look at activities from different views
    Anomalies might look normal from certain aspects and may only be detected from special angles
  Some algorithms works well with certain activity types while others can handle different activities
  Using different algorithm parameters can also change the "view" of the algorithm and what anomalies it may spot
  No algorithm is a silver bullet
Activity Importance
  Goal is to spot unusual activities of high risk users
  Importance of the activity is calculated based on user risk and on algorithm score
    Activity score is calculated from different algorithm scores
  Activities are sorted based on their importance eg. importance=$[[risk^2+score^2]/2]^{(1/2)}$ Analytics
  Additional analytics over users/hosts/activities
    Help algorithms to provide more accurate results
    Help investigator through forensics analysis
  Clustering of users—hosts
    Find similar entities and spot outliers
    Define peer-groups for comparing behavior profiles
  Identify similar activities
    In case of detected suspicious activity find similar potential problems or previous activities
Privacy
  BSP handles activity information of users and knows about their IT fingerprint
  User baseline can show the behavior of humans and it is considered a personal data
  BSP protects personal data by limiting who and under what circumstances can access it
    Pseudo-anonymized data
    4-eyes authorization principle to control data access
    Data encryption
  An example of an anatomy of an attack detection is shown in FIG. 3.
  An example of activity data-flow is shown in FIG. 4.
  An example of activity work-flow-life-cycle is shown in FIG. 5.
  An example of architecture is shown in FIG. 6.
Add-ons
  BSP is a platform product
    All functionality may be implemented through add-ons
    Fetchers, algorithms, exports, automatic-responses, visualization, database layer are all add-ons
    Add-ons can extend/modify the functionality of BSP
  Add-ons provided
    Large set of essential add-on may be provided with the product
  Add-ons may tailor the product to specific needs
    Developed by BB, integration, partner or customer
  APIs available for add-ons are documented
    APIs are not maintained for backward compatibility Inputs & Sources
  BSP uses two data sources:
    Contextual information sources
      Information on users, hosts, but not actual activities
      These information changes infrequently
      Typical sources: Active Directory (AD), Lightweight Directory Access Protocol (LDAP), human resources (HR)-system, IT-asset database (DB)
    Raw user activity data sources
      Any system or application may provide data on activities of the monitored users
      Typical sources: logs (SSB/syslog-ng/SIEM), SCB, databases, csv files, application data through APIs (Application programming interfaces)
  There may be multiple fetcher instances with different parameters to use
    Fetch from different user databases, different event sources or different logs from the same log repository
Activity Data
  Activity data is either pulled or pushed into BSP
  Fetchers are responsible for getting data into BSP and providing a unified view of the data
    username, host, timestamp and other "variables"
    Each fetcher may be specific to a given information source and knows how to fetch & parse data
  Activity data may be categorized/tagged to describe the type of activity it represents
    A simple taxonomy may be defined for activity types
    Types can have mandatory fields that must be filled by fetchers
SCB Activity Data
  SCB has information on user sessions
    Meta information on connections
    Details of user activities in the session
  Fetcher pulls data using SCB search API
    Connection & channel information
    Channel details
    Session activity has information on channel activity. Channel activity has information on command activity and on application activity.
Log as Activity Source
  Logs are pulled by fetchers or pushed by apps
  Fetcher can select which logs messages are considered as user activities
    Fetch only relevant logs if possible (userlist is available)
    Logs for specific groups, logs for user above a risk level, etc.
    patterndb to parse & filter logs
    Heuristics to "understand" & filter messages
  Extract specific patterns: username, host, IP, path etc.
  Determine log structure to find log "type" & variables
  Simple correlation engine to join multi-line messages
Database
  Database holds all user/host/activity/baseline
    Database layer may be implemented as add-on, possible to introduce new database engines later
  Database host can be separated from fetchers, algorithms and the WebUI
    Goal may be to have a "single" host DB option and a scale-out option for large dataset
    In an example, CouchDB & Postgres are supported (CouchDB is an open source database that focuses on ease of use and on being "a database that completely embraces the web". It is a document-oriented NoSQL database that uses JSON to store data, JavaScript as its query language using MapReduce, and HTTP for an API).

Users & Hosts are infrequently changing data
  Everything may be kept "forever"
  Goal may be to handle up to 100,000 entities
Most load may be generated by adding & querying activities
  Activities are cleaned up when not needed anymore
  Database must store relevant activities for months depending on algorithm needs for baseline building Algorithms I.
  Algorithms are responsible for scoring activities
  Algorithms are implemented as add-ons
    It is possible to add algorithms easily
  Algorithms are building baseline using historical data on user behavior
    Algorithms can build baseline for hosts, user groups
      Baselines may be used to identify similarly behaving users/hosts or similar activities
    Activities are scored after they are fetched
      Algorithm specific details may help auditors to understand scores
    Algorithms can provide visualization to display baselines & explain specific activities
  Algorithms can handle only some type of activities Algorithms II.
  Algorithms can have multiple independent instances with different parameters to use
    What activities and/or users to handle (scoring & baseline building)
    Size/length of the baseline
    Weight of the algorithm
    Algorithm specific parameters
  A recommended set of algorithm instances is defined for any site as a starting point
  Multiple algorithm can score one activity
    Algorithm score aggregation may be configured: How to calculate "final" activity scores?

Figure 7:
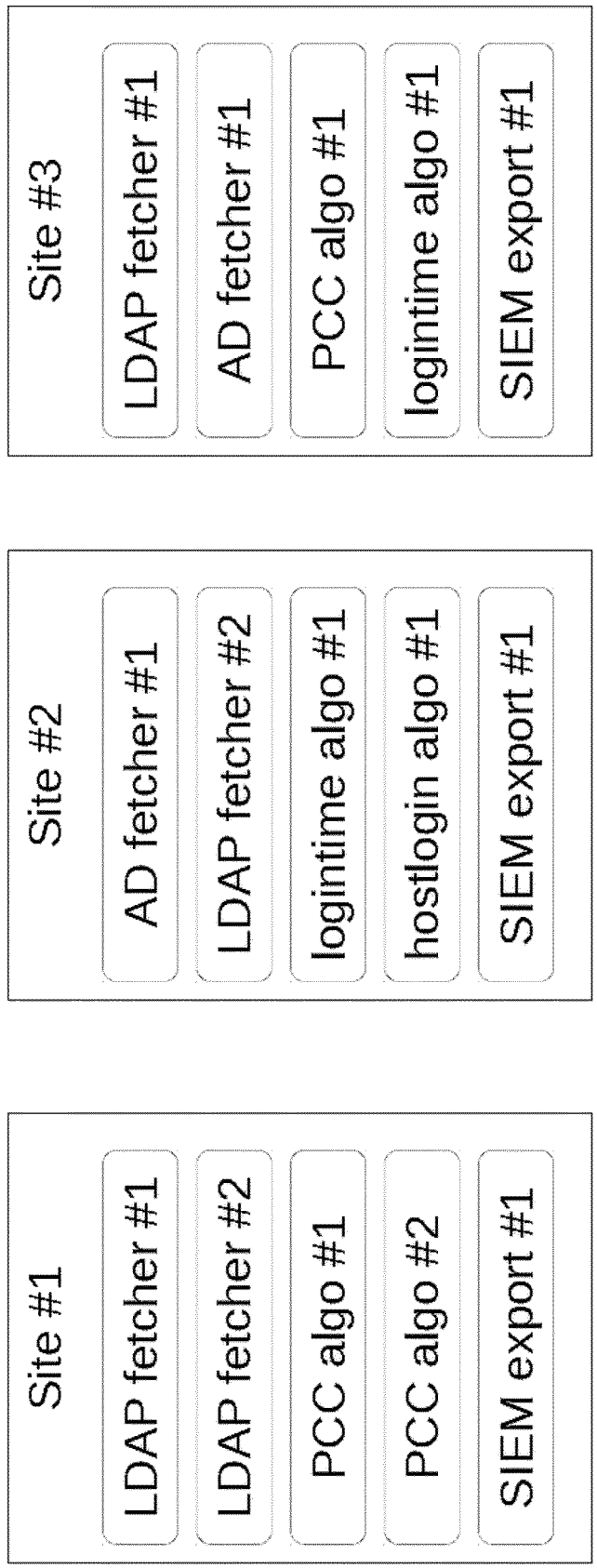
FIG. 7 shows an example of multiple sites' configurations.

Algorithm: Logintime
  Identify logins in unusual time, out of working hours, weekend etc.
  Algorithm learns about typical login-times
  Weekend & weekdays Algorithm: Frequent Item Set
  Identify unusual combination of user activity properties, ie: a combination of aspects/dimensions
    Define which attributes of an activity are considered
  Similar to analyzing customer purchases to see what goods are likely to be bought together
  Find access to systems from an unusual source address or at an unusual time
  Visualize user typical behavior using frequently occurring combination of activity properties Analytics
  Analytics are helper tools to provide better understanding for auditors over users, hosts and activities
    Analytics can be similar to algorithms, but they do not score activities rather just aggregate information
    Analytics can compute information on the fly or using pre-compute batch jobs
  Analytics are implemented as add-ons
    They can extend the normally available information
  Analytics provide visualization and aggregated view of the information stored in the database
    Examples:
      User-host usage diagram
      User risk distribution
      Activity importance summary distribution
      User activity timeline (eg: what hosts were the user accessing, hopping)
      Finding similar users or similar activities Clustering
  Automatically group users/hosts based on their attributes or activities
    Algorithms may use dusters to compare user activities to a broader baseline or in case user has not enough "history"
    Clustering can also show deviation in many aspects from user's configured groups or roles in identity management systems
  Multiple clustering techniques may be used
    Clustering
    Baseline clustering
    Host access
    User attribute clustering
  A "meta-cluster" may be assigned to users based on all clustering algorithms Outputs & Results
  Outputs for the security persons:
    The main output of BSP may be the prioritized list of activities by importance
    Secondary output are the results of the analytics and the algorithm's auxiliary data
  Results may be exported automatically to SIEMs or as alerts and notifications
    Push exports are triggered after activity scoring or as batch jobs
  Data may be accessed using Representational State Transfer (REST) API for integration into existing monitoring infrastructure
  Both exports, REST API and the UI may be extended using addons to provide other view of the information stored in BSP Automatic Response
  BSP can speed-up response time & automate reoccurring tasks
  In case anomalies are detected automatic response may be triggered, eg:
    Disable user account
    Enforce 4-eyes authorization in SCB
    Start session recording in SCB
    Confirm abnormal behavior with the user
  Automatic responses are triggered after activity scoring or as scheduled batch jobs Ticketing & Work-flow Mgmt.
  To handle spotted anomalies BSP support different workflow management strategies
  Important activities are handled
    Ticketing system integration (create new, link tickets)
    Built-in comment, activity assignment to users
    Ticket closing, hiding, ignoring
    Ignoring similar activities
  Define rules to ignore activities within a timeframe
    Useful to ignore activities before baseline update learns about modified behavior
    Foreseeable anomalies may be ignored in advance to reduce false-positives Result Feedback
  Auditors can provide feedback on each activity scoring
    Goal may be to fine-tune algorithm accuracy
    Mark false-positives or over scored activities
    Confirm true-positives Feedback may be used to:
    Adjust algorithm weights to over/under-weight relevant algorithms
    False-positives activities are sent anonymously to BSP cloud center for the system to fine-tune algorithms User Interfaces
    BSP has 2 interfaces for users:
        WebUI where activities, hosts, users may be checked and where results are available
        Work-flow functions are provided by the webUI
    "bspcli" command line interface for managing BSP installation and running maintenance jobs
    REST interface may be available for integration as well
    Configuration may be done through CLI and through configuration files Multi-tenancy & Behavior Analysis as a Service (BaaaS)
    One installation of BSP can serve multiple customers
        Database, configuration, UI are all separated between BSP "sites" (instances)
        Users may be restricted to access only limited sites
        Ideal for Service Providers to serve their own customers or offer BSP as an additional service
        Sites can share the resources or have their own dedicated resources
    Behavior Analysis as a Service
        Cloud offering of BSP for customers who do not want to use an on-premise installation Configuration
    Configuration may be done through site specific configuration files and bspcli utility
    Each site has site global options and can define instances of fetcher, algorithms, responses and other objects
    An example of multiple sites' configurations is given in FIG. 7.

Figure 8:
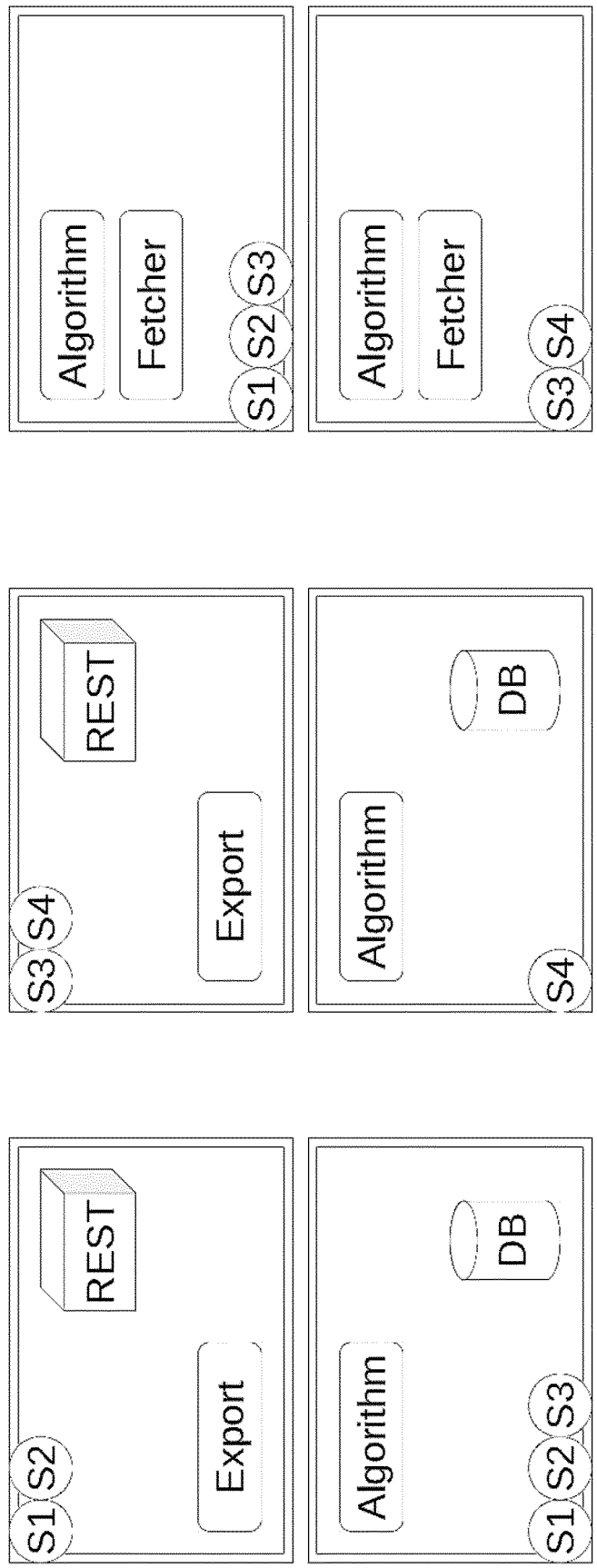
FIG. 8 shows an example of job management.

Examples of Implementations:
    The following components are in use:
        Database server, web server (w/REST), job mgmt
    Job mgmt may be done using cron jobs or triggered by a push event
    An example of job management is shown in FIG. 8.

Installation
    BSP can be installed on a Linux system with the required prerequisites installed
    Installation steps:
        Database servers install (postgres, couch)
        Web-server install (nginx, cherrypy)
        BSP deployment as pip packages
        BSP installs all required dependencies including python using anaconda python distribution
        Initial data import
        Automatic (cron) job setup Initial Data Import
    BSP can load historical data from data sources
        Historical data may be used to build user baseline without a "learning" period
        New activities are scored immediately
        Short history may be also scored to get insights into recent users activities
    Initial data import handles the following:
        Imports users/hosts
        Imports activities
        Calculates clusters
        Build baselines
        Scores activities
    Initial data import must occur after configuring a site and must be done manually using bspcli
    Automatic operation may be only started after initial data import Steps of Integration
    Start with a small defined set of users, servers or applications and extend scope in steps
    At key prospects it may be a good idea to involve Data-Science (DS) team to hold a "Data Day" as part of the integration where customer data may be analyzed by DS team on site to learn about data and help fine-tuning installation
    Customer may be given a presentation on findings and to confirm results
    Information can help setup algorithms, clustering to have more accurate results
    DataDay results can be used in-house to develop new algorithms or improve existing ones
    Key questions to ask part of the integration:
        Estimate the number of users
        Find out where information on users are stored and how different accounts may be mapped (loca accounts, ldap, ad, HR system, application specific users etc.)
        Find out where information on hosts are available (dns, AD, etc.)
        How can user activities be exported from systems, applications (logs, scb, syslog receiving)
        What historical data is available, how can data be imported at installation?
        Estimate the daily, peak amount of events and define the import frequency
        Define the foreseeable history of events that need to be stored in BSP database
        Understand the users of BSP and how their work-flow may be extended, supported by BSP Cloud Integration
    BSP is not just a software platform, but it tries to also provide continuously updated know-how
    Through cloud integration customers can compare user activities & analytics with other organizations baselines
    Only anonymized information may be exported and no information may be shared with other organizations
    The system can learn about key aspects of BSP installation
    Shared information:
        User risk histogram, algorithm parameters, algorithm weights, activity numbers, average baseline, baseline outliers, min/max/average/stddev score given by algorithms/baselines, false-negative activities with baselines, anonymous clusters.

Figure 9:
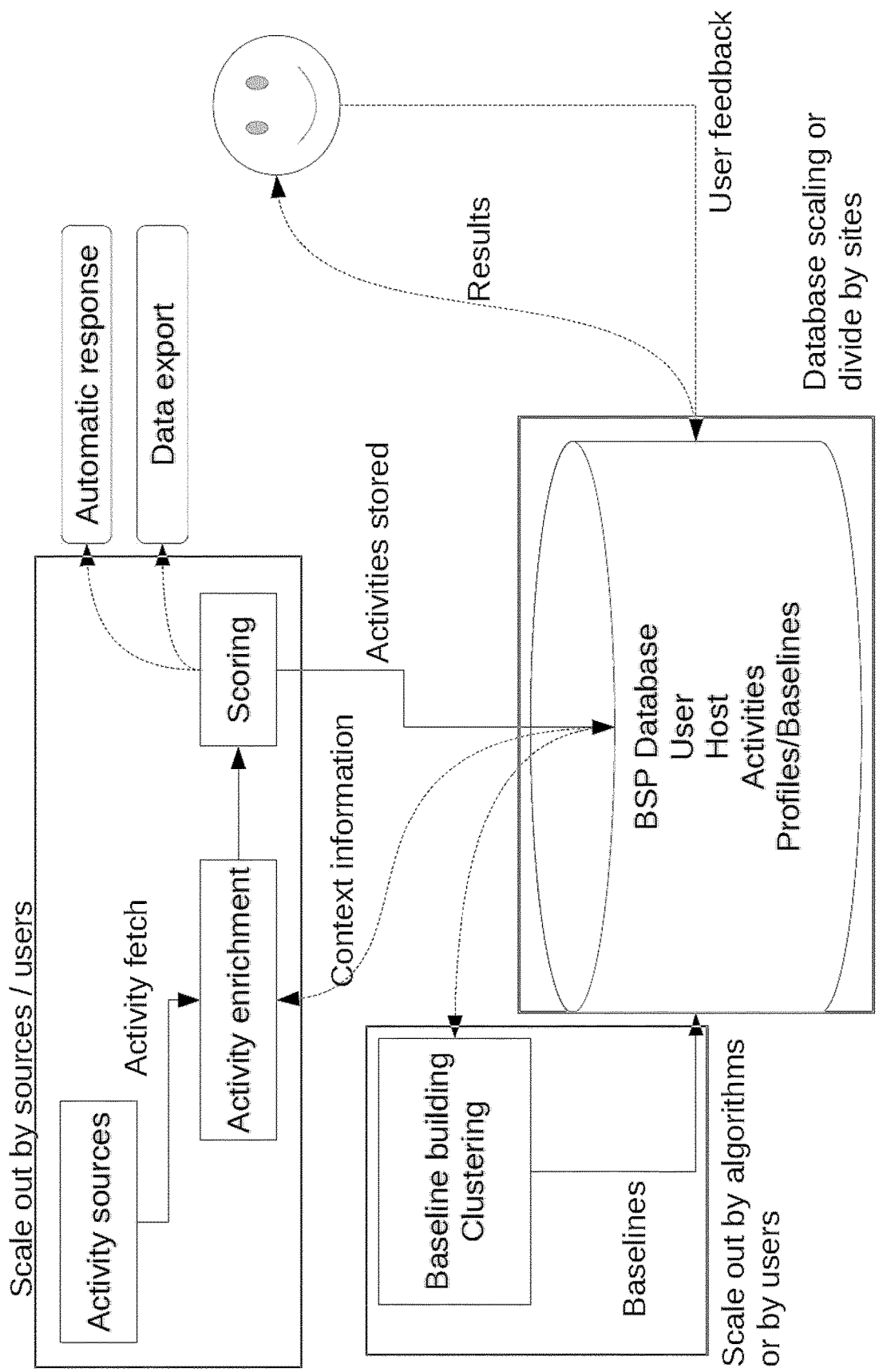
FIG. 9 shows an example of scaling out.

Performance & Scaling
    The following main load factors are critical for BSP performance:
        Database stored data amount
        How much data may be stored, how much data may be added/updated
        Baseline building & analytics batches
        Computational power required to calculate baselines & co.
        Activity fetch & score
        Activity fetch/receive & filtering and processing
        UI usage & REST queries
        Database queries/searches and data post-process
        Database scale horizontally to handle data amount & queries
        Computation scaled horizontally by baseline building or by activity fetch path
    An example of scaling out is shown in FIG. 9.

Extendibility
  REST integration
  Add-ons may be created for:
    Sources
    Algorithms
    Algorithm score aggregates
    Activity importance calculation
    Risk calculations
    Clustering
    Analytics & Visualization
    Automatic reactions
    Etc.
Documentation & Help
  Context sensitive built-in help as a reference and to describe algorithms, charts, etc.
  CLI documentation
  Configuration file documentation
  Detailed "non-data-science-depth" algorithm documentation with usable parameters and suggested defaults
  Detailed API documentation available for developers:
    Add-ons: extension points, core API
    REST interface: HATEOAS. (HATEOAS, an abbreviation for Hypermedia as the Engine of Application State, is a constraint of the REST application architecture that distinguishes it from most other network application architectures. The principle is that a client interacts with a network application entirely through hypermedia provided dynamically by application servers. A REST client needs no prior knowledge about how to interact with any particular application or server beyond a generic understanding of hypermedia. Hypermedia, an extension of the term hypertext, is a nonlinear medium of information which includes graphics, audio, video, plain text and hyperlinks. This contrasts with the broader term multimedia, which may include non-interactive linear presentations as well as hypermedia.)
Continuous Deployment
  BSP uses a continuous deployment model to release updates & fixes
  Updates are distributed through BB infrastructure & updated automatically at customers
    like Anti-virus database updates
  API compatibility may be kept for a defined time period
Use Cases, Features
1. Analyzing User Activity Based on Information Obtained from a Multitude of Sources
  Analysing anomalies in user behaviour based on activity information and additional data gathered by different sources.
    Activity information can be obtained from:
    The commands issued by the user are available from SCB (our Privileged Access Management (PAM) platform).
    The screen contents of the user workflow are available from SCB.
    System logs and audit trails
    network activity, from
      Virtual private network (VPN) concentrator logs
      firewall logs
      netflow from network devices
    cloud service logs, for example
      salesforce
      marketo
      amazon aws
      office 365
    commit log of source code version control systems
      git, svn, mercurial, CSV, gnu arch, . . .
      github logs
    email traffic
    social media activity like facebook, twitter, linkedin, . . .
    mobile phone related data
      usage
      location
      endpoint device usage
    user-defined data sources
    additional information can include:
    user access control information
      from centralized access right management solution
      from other IT systems
    network, infrastructure, application, service and product structure related and process information
      from configuration database
      from Business process management (BPM) applications
      from workflow management applications
      from individual applications containing such information
    how it is done?
    Using streaming and batch interfaces
    similar solutions
    The technologies in obtaining these data are well known, and widely used.
    why is it better?
    Obtaining the data may be the foundation of the solution. The novelty lies in the ways the data will be used when available.
2. Activity Dashboard
  BlindSpotter presents an overview screen (dashboard) for the user to help quick overview of the most important events and trends.
  The dashboard includes and references grouping and visualisations of important data, grouped to gadgets.
  It may be possible to include user-defined gadgets on the dashboard.
    how it is done?
    With usual user interface (UI) techniques.
    why it is better?
    The fact that a dashboard is used to show this kind of data. The data, the relationships, and the visualisation modes shown in the dashboard.
3. Risk-based Activity Prioritisation
  BlindSpotter prioritizes activities based on the risk level of the activities. The risk level may be a function of
    the risk of the user involved
    how unusual is the activity according to the data science algorithms
  Activity prioritisation can also be tuned by
    using user-defined algorithms
    building in user feedback on algorithm quality
    building in feedback of users of other BlindSpotter instances on algorithms
    threat intelligence
    confirmation by the monitored user
    How it is done?
    Events in the raw input are converted to data structures
    Data science algorithms are run on these data structures
    The output of the algorithms may be normalized on a scalar scale (risk points from 0 to 100)
    Similar solutions
    SIEM solutions use patterns to identify high risk activities
    Why it is better?
    The algorithms can prioritize events which were unknown to them before the analysis The different features of the events can be taken into considerations when they are prioritized The timing and sequence of events before and after the one prioritized can be taken into consideration The algorithms can be tuned based on the feedback: the algorithms can "learn"

4. Automated User Risk Calculation

The risk of the user may be calculated based on the permissions of the user.

there may be an algorithm which counts the access rights of the user, and users with more access rights get higher risk score there may be an algorithm which first computes the risk of the access right based on how many users have that right (more user->less risk), and cumulates the risk of the user based on the summary risk score of the access rights the user have the BlindSpotter user can assign risk scores to individual users of access rights. In this case the manually given scores used in the algorithms instead of the computed ones all risk scores (for users and access rights) are normalized to a scalar range it may be possible to define any other algorithm and method to calculate the risk scores, those algorithms can use any data available for BlindSpotter or obtained from external source.

User risk calculation can be influenced by other factors as well:

risky behaviour temporarily increases the risk of the user
 HR related information's on the user
 social media activity of the user
 known bad behavior patterns
 financial information
 classic security clearance information How it is done?

The access rights for each user are counted
 The number of users for each access rights are counted
 The numbers are normalized to a scalar interval
 The other factors are taken into consideration in the computations Similar solutions Risk scores for users/humans are used
 in healthcare to estimate risk of different illnesses
 in some security settings (e.g. in immigration and customs offices) to estimate risk of illicit behaviour Why it is better?

The risk may be calculated automatically
 The estimation of risk related to activities directly uses the risk of the user 5. Automated Actions Based on the risk and nature of the suspicious events—which might become suspicious because of the circumstances and/or the chain of events they are surrounded by—BlindSpotter can initiate automated actions. Those actions can be:

issuing alerts
  in BlindSpotter console
  sending them to other security or operational monitoring software or humans
   using the interface of the monitoring software
   using standard alert or message passing mechanisms (snmp trap, web service)
   in email
 running a custom script How it is done?

See above

Similar solutions

Operational and security monitoring systems often have similar automated actions Why it is better?

The actions are initiated only when the risk is high.

This allows to engage humans in those actions without bothering them unnecessarily.

6. User Confirmation

An automated action of the previous use case is asking confirmation from the user before executing the action initiated by the user. For this BlindSpotter works in concert with SCB, where SCB suspends the execution of the event waiting for risk assessment from BlindSpotter. Based on the outcome of the risk assessment BlindSpotter can abort the action or ask for confirmation in an external channel (e.g. phone call or SMS), or ask SCB to obtain confirmation. If the confirmation is positive, the action is allowed, otherwise the action is not allowed, and BlindSpotter might initiate another automated action to alert staff.

How it is done?

See above. The confirmation is implemented by cooperation of several IT systems. The action and the decision are decoupled.

Similar solutions

User confirmation in the beginning and before some steps of a longer procedure initiated by a user is a widely used technique.

Why it is better?

The need for the user confirmation is decided based on on-line assessment of the risk of the action to be performed by the user.

This way not just foreseen process steps, but previously unknown actions can also be handled
 confirmations is initiated only it is needed 7. Automatic Extraction of Valuable Information from Unstructured Data To be able to detect events, BlindSpotter can obtain the related information from unknown, unstructured data (e.g. log with unknown format). Blindspotter uses heuristics based on pattern matching algorithms to identify events related to its operating domain, bind them to users, classify them and score their risk.

How it is done?

Known data (e.g. user names) are identified in the data using pattern matching techniques.

The structure of the data may be identified using pattern matching techniques and heuristics which take both the usual ways of structuring data, and the changes across similar data entries into considerations.

Similar solutions

Sequence (http://sequencer.io/) uses pattern matching techniques and heuristics to identify patterns in logs Why it is better?

Uses known data to identify records of interest in unknown data

8. Taking Different Time Zones and Public Holidays into Account in Anomaly Detection In categorization and risk scoring of events, different time zones under which the users and applications are operating are taken into consideration.

How it is done?

The time of events may be normalized to the time zone according to the location of the user. The location can be figured out based on its office and/or geoip information.

Workdays and holidays are taken into account.

When everyone/no one works, then someone working/not working is not an anomaly.

Similar solutions

Splunk uses time zones to figure out the time of event normalized to UTC.

http://docs.splunk.com/Documentation/Splunk/6.1/Data/ApplyTimezoneOffsetsToTimeStamps Why it is better?

This solution does not normalize to the same time zone (like splunk), but to the "relative" time according to human daily life cycle.

9. Blacklisting/Whitelisting Users/Time Windows

To handle planned but unusual activities (e.g. migrations, out-of schedule transactions, e.g.) it may be possible to whitelist users/groups who do them and/or time windows when they are done and/or IT systems which handle the actions, such that those activities do not generate false alarms.

To handle changes in procedures and staffing, it may be possible to blacklist the same entities such that they generate alerts for those activities which had been low risk in the past.

How it is done?

Marking users or time ranges in a UI showing them. Using the resulting white/blacklist in the computations.

Similar solutions

Spam filter solutions whitelist/backlist email senders. In the communist era in the east and McCarthy era in the west blacklist were used to deny job opportunities to people considered to be enemies.

Calendars are used to mark time intervals of events and allocate resources for them.

Programs concerned with access control often have some kind of black/whitelisting feature to deny/allow access for users (e.g. ftp and ssh servers).

Phone blacklists/whitelists on caller id.

Netflow analyser does blacklists, but it is not apparent what they do it on. (no sign of it in "feature" page.

Why it is better?

This uses whitelists and blacklists for users and time, and for decision on whether a behaviour conducted by a given user in a given time is risky.

Efficient use of computing resources. Avoiding false alarms, helping to focus on real issues.

10. Privacy Features

To protect the privacy of users monitored by BlindSpotter, and to be compliant with privacy regulations, BlindSpotter can
- do audit logging of the activities conducted on its own interfaces
- provide a self-service portal for users where they can inspect the data collected about them
- pseudonymize user profiles such that early phases of investigations are conducted against a pseudonym without identifying the human behind it
- control de-pseudonymisation using 4-eyes authorisation or other approval method How it is done?

see above

Similar solutions

These features are well-known privacy techniques. They are stated as requirements in privacy regulations and/or IT security standards.

Why it is better?

These techniques are applied to user behaviour data. The pseudonymisation allows to outsource early phases of investigation without privacy concerns, making related operations cheaper.

11. Anachronisms

Blindspotter can
- get rid of old data to make efficient use of computing resources
- reanalyze old datasets with new context (rules and parameters) to find overlooked events
- reanalyze old datasets with the context appropriate at that time to avoid anachronisms How it is done?

we have data algorithms used and their parameters (parameters)

From the data and the parameters we can create a baseline. The data and the parameters can come from different time.

Anomalies are detected using the baseline and the data. The baseline and the data can come from different time.

The old data and the old context may be stored. When there is a need to evaluate a specific data in a specific context, the data and the context may be loaded and the algorithms are run using them.

Similar solutions nothing found

Why it is better?

It can find overlooked events by evaluating old data in new context.

It can avoid anachronisms by evaluating old data in its own context.

12. Shared Account Detection, Binding Shared Accounts to Real User Based on Behaviour Sometimes accounts are shared by multiple humans because of technological, license or human problems. Sometimes technical accounts are used by humans. BlindSpotter can guess which individual uses a specific account based on the behaviour and/or other contextual information (e.g. who uses a jumphost which can reach the device at the time of access).

How it is done?

Applying data science algorithms aimed at distinction of the behaviour of different humans.

Similar solutions

Gurucul boasts "shared account monitoring", however it is not clear what they mean on this.

https://www3.nd.edu/~dial/papers/MINENET07.pdf uses clustering techniques to detect anomalies, and one of the true positives is an instance of account sharing Why it is better?

The shared account detection is about algorithms specifically tuned to spot shared accounts.

There is no known solutions to identify users of shared account based on behaviour.

Can spot misuse of accounts, helps enhancing accountability.

13. Detecting Mix of Technical and Human Usage

Sometimes human accounts are used for technical purposes (driven by scripts).

BlindSpotter detects scripted usage of human accounts based on behaviour.

How it is done?

Applying data science algorithms aimed at distinct between human and technical user behaviour.

Similar solutions

HP ArcSight uses rule-based techniques to detect account use from unusual endpoints. (which is in most cases another type of misuse, and most instances of this case are not detected by this)

https://www.ultimatewindowssecurity.com/resources/whitepaper/3BigData.pdf

Why it is better?

Can spot misuse of accounts. No need to build intermediate tables and create rules by hand. In most cases technical user abuse cannot be spotted based on endpoint. This one is based on behaviour.

14. Dynamic Alert Threshold

The threshold for alerts may be a risk score value above which an alert is generated. The alert threshold can be set manually to an exact value. The alert threshold can also be defined in a dynamic way where the goal is to issue approximately the same number of alerts in a time period (e.g: give me approx 20 alerts a day), making resource management of the staff using BlindSpotter easier, in a risk based way.

How it is done?

Dynamically tuning the alert threshold using an algorithm similar to the ones used at process control Similar solutions Process control algorithms is a well established area Why it is better?

It is used to tune the number of alerts. This way the resource management of staff is easier, as the workload can be planned.

15. Manual Flagging of Activities

It is possible for staff to manually flag activities as "suspicious" or "okay". The flagging result can be used to automatically tune the detection algorithms used.

How it is done?

By presenting the activities to the staff on a UI, where the activities can be manually flagged.

Similar solutions

SIEM solutions allow mark events identified by the solution as "dealt with".

Machine learning algorithms are usually built on user feedback:
  the "this is spam" button in gmail
  "tinder robot": http://www.theatlantic.com/technology/archive/2015/02/the-tinder-bot-that-knows-when-to-swipe-right/385446/
  Why it is better?
  Used for quantify risk of events.

16. Keeping Track of Alert Status

Blindspotter can integrate with issue/task/incident management software such that the status of alerts can be tracked, answering the two important questions:
  are there all alerts handled by someone?
  did I see all the alerts which I have to see?
  How it is done?
  Sending the information on the alert to an issue/task/incident management software, with a backreference to the BlindSpotter console.
  Similar solutions
  Software dealing with security or operational incident detection usually includes functionality to either manage the status itself, or handle the incident to a issue/task/incident management software.
  Why it is better?
  Implementing our own solution for issue tracking would make the overall quality of the solution lower.
  The alerts are generated by BlindSpotter :)

17. Cloud Integration and Intelligence Sharing

Blindspotter can use rules and parameters obtained from an "intelligence hub", and can facilitate threat intelligence sharing by uploading its rules and parameters into an "intelligence hub".

The information shared can be configured according to the trust between installations participating in threat intelligence sharing (e.g. installations in the same enterprise share all information, installations in different enterprises share only non-confidential parameters).

There can be more than one intelligence hubs defined with different trust levels.

The shared information can be overviewed by an administrator before sharing it.

How it is done?

Threat intelligence may be filtered according to trust criteria, and uploaded to a shared repository.

Threat intelligence may be downloaded from a shared repository, and used to configure the system and algorithms.

Similar solutions

Shared repositories are used for a lot of purposes (e.g. github for sharing programming intelligence)

Why it is better?

It shares readily machine useable threat intelligence information.

18. Show Typical Information

BlindSpotter can
  show histograms, distributions, baseline visualisation for peer groups and entire company based on typical behaviour
  show the behaviour of an individual or group of individuals above the typical behaviour as a background
  How it is done?
  Usual visualisation techniques.
  Similar solutions
  Visualisation of user behaviour is a well researched area, with many implementations (e.g. Google Analytics)
  Why it is better?
  Uses group behaviour as a background to help better understand how the behaviour of the individual is atypical.

19. Coordinated Activities

Blindspotter can detect coordinated anomalous activities of a group of individuals, not just a sole human.

How it is done?

The data science algorithms are tuned to identify cooperative work.

Similar solutions

CARDS: http://link.springer.com/chapter/10.1007/978-0-387-35515-3_18 A signature-based system.

http://proceedings.spiedigitallibrary.org/proceeding.aspx?articleid=1691332 Using classical surveillance (person and vehicle track) information.

Why it is better?

This applies behaviour analysis (as opposed to a signature-based system) to online activities (as opposed to offline spatial data). Online activities means a richer set of activities.

20. Financial Transactions

Recording transactions of a trader can be used to build a baseline of her typical activities: the securities she is usually trading with, the time period she's active, the volumes she's usually transferring. An anomaly in this activity can be a signal of a rouge trader, insider trading or that her terminal's been hijacked by an adversary trying to affect stock prices.

In that case we can pause the transaction or ask for n additional layer of authentication.

How it is done?

Applying data science algorithms to trader activities, which score the risk of the activities.

Similar solutions

This is a well-researched area.

Why it is better?

Can correlate trading-related data with other kind of activities (e.g. social media, use of other IT systems).

21. Endpoint Security

Today's endpoint devices (desktop PCs, laptops, tablets, mobiles etc.) are highly personalized and their usage reflects the typical life patterns or their users. A software installed on these devices may record and analyze circumstantial (eg. GPS location, movement, orientation, ambient sound and lightning) and usage (eg. applications, network traffic) data and BlindSpotter can detect anomalies. Such an anomaly might signal a stolen device or malware activity.

How it is done?

The installed software on the device gathers and transmits the data to a BlindSpotter instance. Blindspotter applies data science algorithms to the data and spots anomalies.

Similar solutions existing endpoint security solutions are focusing on hardening and pattern based incident detection.

http://www.dai-labor.de/fileadmin/Files/Publikationen/Buchdatei/sm_priv_acm.pdf anomaly detection of smartphone usage. Analysis is done by humans.

anomaly based IDS building on mobile use data: http://www.icsd.aegean.gr/publication_files/journal/383613018.pdf Why it is better?

The last one covers the use case.

22. Physical Activities->Medical Care

With the emergence of activity trackers and other wearable device more and more health and activity related data such as movement, heart rate or blood pressure is being collected. This data can be collected from multiple individuals, and a baseline on a group can be collected. The groups are identified using machine learning algorithms. An anomaly in this data can be a signal of health problems or even emergencies in extreme cases. The person wearing those devices, her physician or emergency medical teams may be alerted to ensure early response.

How it is done?

Wearable devices record and transmit biology related measures to a BlindSpotter instance. groups are identified using machine learning algorithms. Baselines from the data corresponding to groups of individuals are built. Machine learning algorithms are applied to the data gathered from an individual using the group baseline.

Similar solutions http://www.researchgate.net/profile/Alexandros_Pantelopoulos/publication/224610780_A_Survey_on_Wearable_Sensor-Based_Systems_for_Health_Monitoring_and_Prognosis/links/0deec52267a3054aa4000 000.pdf An overview of the state of the art. There are mentions of intelligent algorithms to identify type and intensity of user activity, neural nets used, etc.

Why it is better?

Takes into consideration the baseline of a group, not just one individual.

23. Stolen/Shared Account Detection in Online Games

Users of MMORPGs (massively multiplayer on-line role playing games) build an avatar for themselves which moves in and interacts with the digital world and its inhabitants just as a real person does in the real world. The behavior of this digital alter ego can be analyzed. Analysis of this behavior can reveal hijacked accounts, shared accounts or accounts being used for automated repetitive activity ("farming"), all of which is usually prohibited by the end-user license agreement (EULA) of these games and might ruin gameplay for other players.

How it is done?

Create models for user behaviour based on the activity of the player, behaviour inside the game such as common patterns of in-game decisions items, strategies.

Similar solutions https://gupea.ub.gu.se/ Outlier detection in online gambling https://angel.co/panopticon—a whole company specializing on the area Why it is better?

In the BSP PCC algo we use the output of the PCA differently (minor-major scores and not subspaces) (math details)

panopticon: same vision. (no technology background published)

24. Industrial Espionage

During their work, most people interact with others according to a quite well-defined pattern. Some only communicate within the organization, some only do with certain clients or partners. Some tend to send huge attachments along with their emails, some never do so. An anomaly in this communication pattern might mean that the employee has been bribed to steal information from within the enterprise.

How it is done?

Similar solutions

It is a well-researched area http://dl.acm.org/citation.cfm?d=2403614 http://www.ieee-security.org/TC/SPW2012/proceedings/4740a117.pdf using consensus-clustering for multi-view anomaly detection Why it is better?

Using anomaly detection based on not just personal baseline but the baseline of the peer group.

25. Detecting Tiredness in Airplane/Train/Car/ . . .

Operating large vehicles and heavy machinery is a risky job where fatigue of the operator can lead to disastrous consequences. It is possible to collect lots of data points about the activities of the operator, response times and the usage of different functionality of the machinery being the most important. A deviation from the usual patterns of work of the given operator can reveal that he is not up to the job due to fatigue or other factors such as being intoxicated. Preventing him from further use of the machinery can prevent injuries and serious damage of the equipment.

How it is done?

Applying data science algorithms to operator activities.

Similar solutions http://cs229.stanford.edu/proj2009/TinocoDeRubira.pdf a system using face imagery to detect fatigue.

All major car maker have such a system.

http://en.wikipedia.org/wiki/Driver_drowsiness_detection

26. Detecting Strange Behaviour of Visitor of Web Page

Visitors of a website usually act according to certain patterns: most of them tend to use the functionality of the site in predictable ways. A highly unusual activity pattern can signal an attack against the site and blocking it can improve security.

How it is done?

Similar solutions

A solution for detecting anomalous web page visitor activity was proposed by Ted Dunning et al. http://datainformed.com/anomaly-detection-new-black/ It predicts the number of visits at the web page, and alerts if the predicted number is different from the observed.

http://airccse.org/journal/ijcsea/papers/
4114ijcsea01.pdf—this paper is about using access logs to discover anomalies, for the purpose of separating normal users from "scanners", or detecting attack.

Why it is better?

The users are clustered. Thus, activities can be scored compared to the baseline behavior of the peer group.

Uses less domain specific knowledge (than the 2nd).

Applying data science algorithms to web page visitor data.

27. Who Grows Marijuana?

Through the deployment of newer digital meters, utilities providers collect and record thousands of data points from the consumers' energy and other usage. A sudden spike or other anomaly in the utility usage of a customer might signal either a problem with the distribution network (eg. a leaking pipe), illicit usage (eg. tapped electric wire) or concealed and potentially illegal industrial or agricultural activity such as a drug lab or indoor marijuana plantation.

How it is done?

Applying data science algorithms to utilities usage patterns.

Similar solutions http://ieeexplore.ieee.org/xpl/
login.jsp?tp=&arnumber=6039858&url=http%3A%2F%2Fieeexplore.ieee.org%2Fxpls%2Fabs_all.jsp%3Farnumber%3D6039858 http://www.cse.cuhk.edu.hk/lyu/_media/paper/zibin-dsn2011.pdf?id=students%3Aphd&cache=cache Why it is better?

The use case uses time series of data from the meters, and uses metadata.

Uses less domain specific knowledge.

28. Anomaly Detection on Sensor Networks

There are many applications of sensor networks, where an array of sensors are measuring different aspects of an automated system. If the system is not functioning properly, the sensors will probably report different values than in normal operation. These malfunctions can be detected right away, even before actual problems arise using anomaly detection. This can be used in manufacturing, facility management, etc.

How it is done?

Similar solutions http://ieeexplore.ieee.org/xpl/
login.jsp?tp=&arnumber=5451757&url=http%3A%2F%2Fieeexplore.ieee.org%2Fxpls%2Fabs_all.jsp%3Farnumber%3D5451757 http://ionia.bu.edu/Publications/papers/TOSN-final.pdf http://www.cse.cuhk.edu.hk/lyu/_media/paper/zibin-dsn2011.pdf?id=students%3Aphd&cache=cache Why it is better?

Uses less domain specific knowledge.

29. Monitoring Entry Control Systems

Many corporations use entry control systems to restrict entrance to different areas of a building. These entries generate data which we can use to build a profile, and we can detect anomalies by monitoring the entries.

How it is done?

Similar solutions https://www.capgemini.com/resource-file-access/resource/pdf/anomalous_behavior_detection_reference_architecture_and_enterprise_approaches.pdf mentions such use cases without much detail http://www.cs.ucc.ie/~simon/pubs/crisis2012.pdf anomaly detection about the configuration (not the use) of the physical security measures http://www.researchgate.net/profile/Simon_Fong/publication/4274046_A_Security_Model_for_Detecting_Suspicious_Patterns_in_Physical_Environment/links/0912f50bb87 7215172000000.pdf this seems to cover the use case.

Why it is better?

We use more algorithms.

We can correlate with the usage patterns of IT applications.

30. Operating Server Clusters

When a hosting firm operates large clusters of servers, usually many characteristics of the servers are measured (CPU and memory usage, temperature inside the box, etc.). These characteristics can also be used to profile normal operation, and detect malfunctioning hardware with anomaly detection.

How it is done?

Similar solutions

There are a lot of research in the context of "smart city".

There is a company for anomaly detection in the IT infrastructure: http://www.metaforsoftware.com/#anomalydetection Anomaly detection in critical infrastructures: http://www.davidgamez.eu/papers/
JinBighamRodawayGamezPhillips06_AnomalyDetectionElectricity.pdf Context-Aware Time Series Anomaly Detection for Complex Systems http://www.nec-labs.com/~gfi/gupta-sdm-13.pdf Prelert does something similar Why it is better?

Automatic model selection: finding out both the type of statistical model and the applicable parameters.

Finding subsets of data for fitting different models to each subset needs no domain knowledge, BlindSpotter automatically figures out the parameter to be used for subsetting, and the subsets.

We are using more robust way to create final scores: by utilizing a sigmoid function during scoring, where the final score of activities are not affected extremely by extreme scores.

31. Behaviour Analysis in Mobile Application, Looking for Stolen Mobiles

Behaviour analysis in mobile applications, looking for unauthorized usage. For example you cannot open an application when you used to sleep.

How it is done?

A product or concept of using the signature of "picking up the phone from the table by the owner" to spot intrusive user patterns. (not been able to found)

Similar solutions

Seems to cover the use case: https://cs.fit.edu/media/
http://iidia.com.ar/rgm/articulos/R-lnai-2005.pdf fraud detection in CDR data baseline-difference approach http://iieng.org/siteadmin/upload/2550E1014073.pdf as an example of machine learning Why it is better?

More algos. Bsp clears the baseline from already installed malicious activities. Using peers sudden changes in peers to signal.

32. Detecting Stolen Car by Driver Behaviour

Based on the learned driving behaviour BlindSpotter can decide on the person of the driver, and notify the owner on it. If the car have the profile of the actual driver, it can even identify who drives.

How it is done?

Similar solutions (see the previous and next, and also drowsiness detection solutions)

Why it is better?

Using both supervised and unsupervised algorithms.

33. Analysis of Activity Based on Mobile Sensor Data, Looking for Stolen Mobile

Gps sensors of vehicles or mobile phones can detect that the vehicle/user have deviated from the usual track, and can issue warning based on that.

Traffic analysis based on gps/mobile sensor and warning/prediction on where a traffic jam can be expected based on last three months data.

How it is done?

Build a profile from sensor movements and measurements, apply data science algorithms using this baseline to spot anomalies.

Similar solutions

Seems to cover the use case: https://cs.fit.edu/media/TechnicalReports/cs-2007-02.pdf Why it is better?

This use case is only using coordinates and timestamps, and some smoothing algos. BSP can use finer grade information about the user, himself.

Uses both the human, the phone and the application.

34. Behaviour Analysis on Encrypted Data

Blindspotter receives only encrypted data, it does the analysis and machine learning on the encrypted data set. This way even the operator cannot know the real data. When a unusual behaviour is identified, someone with access to the original data can act upon it.

How it is done?

Similar solutions http://www.cs.cmu.edu/~jorjeta/Papers/smartgridcomm2014a.pdf relates to network traffic data Why it is better?

It is not just for network behaviour.

User-level granularity.

This is for privacy use cases.

35. Anomaly Detection on Procedures

Based on the event time series attached to a procedure (e.g. software development procedures), Bottlenecks and unusual behaviour can be detected, and good practices can be recommended.

Use behavioral analysis and machine learning to identify usual behaviour and detect unusual behaviour which might indicate stolen account.

Semantical analysis in the communication of the whole enterprise (email, chat, voice), and detection of communications not aligned with the "corporate semantics" in real time.

How it is done?

Similar solutions (not found with a quick search)

36. Identifying High-risk Spots for Crime ("Minority Report")

Based on time series data of utilities use (behaviour patterns of tenants), geospatial data on the neighbourhood (e.g. street lightning and surveillance) and previous crime data, identify households/spots where the risk of crime is the highest, and plan patrols accordingly.

How it is done?

Similar solutions

The movie "Minority Report".

http://www.datascienceweekly.org/data-scientist-interviews/predictive-policing-george-mohler-interview https://inclass.kaggle.com/c/predict-10-key-crime-incidences-for-10-districts-in-karnataka/details/data-science-guidelines http://theinstitute.ieee.org/technology-focus/technology-topic/the-future-of-crime-prevention (Palantir mentioned)

Why it is better?

Uses utility data to figure out tenant's behaviour pattern. Able to spot not just the neighborhood, but the household.

37. Using Utility Meter Data to Figure out the Change in the Number or Identity of People in a household Based on time series data of utilities use (behaviour patterns of tenants), a change in the number or composition of tenants can be detected. This can be a clue for the owner.

How it is done?

By modelling the load curves and spot differences and shifts in a particular household's curve.

Similar solutions

For modeling curves example: http://www.slideshare.net/Hadoop_Summit/courbospark-decision-tree-for-timeseries-on-spark it is used for market segmentation in this use case.

Why it is better?

Bps approach would use more algorithms, create peer groups for comparison, incorporate usage metadata into the model (not just the load curve itself) (eg smart car, ac unit, internet usage)

Others (not elaborated):

38. Voice Analysis for Detection of Mood and Against Fraudulent Activities. Would Notify if the Voice Stream is Manipulated.

39. Detection of Mood in the Corporate Communication. Analysis of Change of Mood e.g. after Communication of Decisions 40. Detection of Attack Preparation (Information Gathering) on the Web Site Based on the Requests Received by the Web Server.

Installing Blindspotter: Example

Prepare the underlying OS

Blindspotter has been tested on Ubuntu 14.04 (trusty tahr). In addition to a base system, you will also need these packages at least:

apt-get install postgresql

Extracting Blindspotter

In order to install Blindspotter on your system, please acquire a distribution tarball.

Example you can get that in the Blindspotter CI within the system, at:

http://testbed.bsp.balabit:8080/job/blindspotter%20release/lastSuccessfulBuild/artifact/dist/

You will find two build products there, a .tar.gz and an .egg. You will need the former to do an initial installation.

Once you have the tarball on the system, you need to extract the archive while in an example the working directory is set to the /opt directory with root privileges.

cd/opt

<xx> denotes release number, a sequentially increasing number sudo tar xzpf blindspotter-r<XX>.tar.gz This will place every file needed to run Blindspotter into /opt/blindspotter. Inside that, there is a standard UNIX directory layout for an application. All Blindspotter related binary files will be found in /opt/blindspotter/bin.

Blindspotter Command Line Tool

The Blindspotter command line tool bspcli is installed into/opt/blindspotter/bin, so once you add that directory to your PATH, you can start experimenting with Blindspotter right away.

/opt/blindspotter/bin/bspcli help

Creating the Initial Site Configuration

Blindspotter requires initial configuration and a database to be usable. This basically boils down to a working /opt/ blindspotter/etc/blindspotter.conf and at least one site configuration in /opt/blindspotter/etc/site.conf.

Please consult the Configuration chapter for more details.

You will need to set up PostgreSQL (as described in PostgresDB) and create the customer specific database using:

/opt/blindspotter/bin/bspcli --site <site> create-db

Launching the Web Interface

Once you have basic configuration in place, you can start the web service using

/opt/blindspotter/bin/bspweb

Blindspotter defaults to opening its HTTP listener on localhost, port 8080, so you can open it in your browser at http://localhost:8080/

The local user database is stored in /opt/blindspotter/etc/passwd, details on how it needs to be set up is available in the Configuration chapter.

Setting Up CRON (a Time-Based Job Scheduler in Unix-Like Computer Operating Systems)

In an example, cron jobs are responsible for periodic baseline building and periodic entity scoring. Periodic baseline building may be done via a cron job, by default it is running in every 4 hours. The default crontab file can be found here: /opt/blindspotter/etc/crontab.

For using under development a sample cron file can be found at ~/zwa/projects/blindspotter-1.0/source/bsp/scripts/crontab_devmode.

Replacing your current crontab file with /opt/blindspotter/etc/crontab:

crontab -u <username>/opt/blindspotter/etc/crontab

Appending the Blindspotter cron job to your existing crontab file:

(crontab -l; cat/opt/blindspotter/etc/crontab)|crontab -

Changing the time when the baseline building runs can be done easily, either with editing the /opt/blindspotter/etc/crontab or with the following command:

crontab -e

The format of crontab jobs:

```
* * * * * <command to be executed>
| | | | |
| | | | +----- day of week (0 - 6) (Sunday=0)
| | | +------- month (1 - 12)
| | +--------- day of month (1 - 31)
| +----------- hour (0 - 23)
+------------- min (0 - 59)
```

Configuration

Blindspotter is multi-tenant by default, making it possible to run customer-specific instances in parallel. These customer specific instances are called 'sites' throughout in this documentation.

That said, the configuration of Blindspotter reside in /opt/blindspotter/etc, comprising of various files in .ini format.

1. a main blindspotter config (named blindspotter.conf) with global options and list of configured sites
2. a site-specific config (named site.conf with site-specific options
3. and a local user database in passwd Global Options Global Blindspotter options reside in /opt/blindspotter/etc/blindspotter.conf, this file can be used to specify global options, such as the listening address, SSL keys, the set of sites running in this Blindspotter instance.

Global options are listed in a section named "[global]".

Setting Up HTTP Listening Address

Edit blindspotter.conf and set port and host:

```
[global]
server.socket_port: 8080
server.socket_host: "0.0.0.0"
```

Enabling HTTPS

You need a valid X.509 certificate and corresponding private key in order to enable Secure Sockets Layer (SSL), both in separate files, formatted in the PEM (Privacy-enhanced Electronic Mail) format. Make sure you have the following lines in blindspotter.conf and make sure the certificate files exist:

```
[global]
server.ssl_module:"pyopenssl"
server.ssl_certificate:"/opt/blindspotter/etc/https.crt"
server.ssl_private_key:"/opt/blindspotter/etc/https.key"
```

You can use OpenSSL tools to create new certificates, or you can acquire them from a trusted certification authority (CA) service.

Once configured and the Blindspotter web service restarted, the site will be available on the https://localhost:8080 URL.

Adding a Site

Edit blindspotter.conf and add a new row:

tree.<customer_name>: bsp.web.app.bsp_site ("customer-name")

customer_name can only contain lowercase english letters, digits and dashes.

Site Specific Configuration

Site specific configuration is stored in the /opt/blindspotter/etc/customer-name.conf, this is a regular ini file. The site related global options go to a section named the same as the customer, other options may have their dedicated section in the configuration file:

```
[<customer-name>]
database_type: "postgresdb"
addons: "foo,bar,baz"
...
```

Setting Up the Addons to Load

Blindspotter is architected in a way to allow granular extension of functionality with the use of addons, therefore listing the required set of addons is an important part of the configuration.

To do customize the set of addons to load, the addons configuration setting in the customer globals must be set:

```
[<customer-name>]
addons="bsp.addons.postgresdb,bsp.addons.logintime,bsp.addons.pcc,bsp.addons.hostlogin,
```

The value is a string, containing comma separated list of Python modules to load as addons.

Read more about addons in the Addon Reference.

Setting the Database Type

The database used to store activities, users and hosts can be configured using the "database_type" and related options in the site specific globals:

```
[<customer-name>]
database_type: "<database-type>"
# other database specific options may follow
```

The database_type setting refers to a loaded database addon.

Using PostgreSQL to Store Data (PostgreSQL, often simply Postgres, is an object-relational database management system (ORDBMS) with an emphasis on extensibility and on standards-compliance.)

To use PostgreSQL to store the Blindspotter database, make sure that you load the bsp.addons.postgresdb addon, and use these configuration settings:

```
[<customer-name>]
# make sure the addon contains postgresdb
addons: "...,bsp.addons.postgresdb,..."
# set the database type
database_type: "postgresdb"
# set postgres access parameters
postgres_dsn: "host=foobar user=bsp password=bsp"
```

As of now, the PostgreSQL database is automatically named as "bsp_<customer>".

Adding Algorithm Blocks

Algorithm configurations are also added to the site specific configuration file. They use dedicated sections named as "[algo: <algo instance name>]", where the algorithm specific configuration settings are specified:

```
[algo: foobar]
# the name of the algorithm implementation
algorithm: 'logintime'
# the list of columns the algorithm instance works as inputs
relevant_columns:['details.start_time_time_hours',
'details.start_time_is_workday']
# list of transformations to be applied to the inputs before the algorithm processes them
pipeline.transforms: [ ]
# The weight of this algorithm when weightedavg is used
scoring.weight: 1
# the time window of baseline activities
time_window: '3w'
# the number of minimum activities whereof algorithm can build baseline
baseline_threshold: 50
# list of activity types to be applied when building a baseline or score activities
activity_type: ['session', 'closed_session', 'email']
```

Algorithm implementations may take additional configuration options from this configuration, those settings are algorithm specific, but they always start with the prefix "algorithm.". See the subsequent chapters on the documentation for algorithm implementations.

Algorithms are implemented by addons, so make sure the appropriate addon is loaded. The syntax of the time_window may be the following:

```
'<number>h' (<number> of hours before now)
'<number>d' (<number> of days before now)
'<number>w' (<number> of weeks before now)
```

Setting up the "logintime" algorithm
Setting up the "hostlogin" algorithm
Setting up the "pcc" algorithm
Setting up the "fis" algorithm Setting Up One-dimensional Field Analysis One-dimensional field analysis may be used to give a quick visualization for the user about which field values in an activity can be considered unusual. It would make a weak algorithm if we used it for real scoring, but in return the results are extremely easy-to-understand during analysis, especially compared to the baselines of complex algorithms like FIS. The calculation may be done on-the-fly when an activity details page is fetched.

It may be possible to configure the fields this analysis is performed on, the window of the analysis (preferably set to the same value as the baselining window to make sure its results align well with the results of the real scoring) and the threshold above which the field is highlighted on the UI.

```
[onedimensional]
# the list of columns the onedimensional works as inputs
relevant_columns: ['start_timestamp', 'details.*']
# this threshold used to determine which fields are interesting
threshold: 90
# the time window of baseline activities
time_window: '3w'
```

The syntax of the time_window may be the following:

```
'<number>h' (<number> of hours before now)
'<number>d' (<number> of days before now)
'<number>w' (<number> of weeks before now)
```

Setting Up Score Aggregation

Aggregation of activity scores is also configurable in the site specific configuration file, using a section named "scoring":

```
[scoring]
aggregator: 'aggregate_function_name'
```

Right now the Blindspotter core provides the following aggregator functions:
 rts—Root mean square
 amax—Maximum search
 weightedavg—Weighted arithmetic mean Weighted function use 1 as default weight for each algorithm instances. You can overwrite it if you set scoring_weight under an algorithm instance in config file:

```
[algo: algo_name]
scoring_weight: 1
```

Setting Up Entity Scoring

You can specify a time-window in which to collect the activities for entities.

| [entity_scoring] |
|---|
| time_window: '1d' |

The syntax of the time_window may be the following:

| '<number>h' (<number> of hours before now) |
|---|
| '<number>d' (<number> of days before now) |
| '<number>w' (<number> of weeks before now) |

Passwords

Blindspotter can only be accessed using a valid password, which may be stored in $ {root}/etc/passwd. The format of the password file is:

username:encrypted-passwd:sites-allowed
local:aaThuZok4XcTA:local,example

The columns of the passwd file are as follows:

username—The name of the user, should contain [a-zA-Z0-9] characters encrypted-passwd—the password encrypted using crypt (3)

sites-allowed—the comma separated list of Blindspotter sites allowed to be accessed Here's a short script to generate encrypted passwords using Python (or you can do a similar thing with htpasswd provided by the Apache package)

```
import crypt
import random
import string
def __generate_salt( ):
    return "$1$" + "".join(random.choice(string.digits + string.lowercase + string.uppercase)
    for __ in range(6))
print("Enter password (will be echoed on the screen): ")
print(crypt.crypt(raw__input( ).strip( ), __generate_salt( )))
```

Feeding Activity Information to Blindspotter

The primary goal of Blindspotter is to receive and ingest activity streams of users, then process those activities and assign an importance score that makes it possible to process them in priority order.

SCB Fetcher Addon

Using SCB Fetcher, we can import activity data originated from Shell Control Box. There are two kinds of fetch, initial and real time. Real time fetching can be used to fetch newly generated data continuously, the SCB fetcher will remember it's state (where it stopped last time). But before we can fetch real time, we first have to run an initial fetch, which will get the initial data (in a given time range), and set up the state of the fetcher. This also means that if we run an initial fetch after real time fetching, the fetcher state will reset, so probably duplicate data will show up in our database.

We can use three different backends for fetching data from the SCB, namely PgSQL backend (the backend's purpose is to integrate with PostgreSQL), SOAP backend (SOAP: a protocol specification for exchanging structured information in the implementation of web services in computer networks) (RPC API), and Comma Separated Values (CSV) backend. The CSV backend may only support initial fetch, but for real time, we can use PgSQL or SOAP too (but for PgSQL, we may need root privilege on the box).

Backend Configuration

The configuration of backends may be mostly done in the site config. The field names are selfexplanatory, but you must pay attention to use the proper fetcher name. For the SCB fetcher, it is 'scbactivity'. Also, for the fetcher.backend field, the only valid values are 'csv', 'pgsql' and 'soap'.

[fetcher: scb_csv]
fetcher: 'scbactivity'
fetcher.backend: 'csv'
fetcher.backend.csv_filename: 'features/assets/scbimport.csv'
[fetcher: scb_pgsql]
fetcher: 'scbactivity'
fetcher.backend: 'pgsql'
fetcher.backend.pgsql_dbname: 'scb_111'
fetcher.backend.pgsql_host: '10.170.1.2'
fetcher.backend.pgsql_user: 'scb'
fetcher.backend.pgsql_password: ''
[fetcher: scb_soap]
fetcher: 'scbactivity'
fetcher.backend: 'soap'
fetcher.backend.soap_hostname: '10.170.42.1'
fetcher.backend.soap_api_version: '4.0.0'
fetcher.backend.soap_api_username: 'admin'
fetcher.backend.soap_api_password: 'a'

Using BSPCLI for Fetching

You can use BSPCLI to use the fetcher directly. There are two commands for this, fetchinitial-scb and fetch-real-time-scb. The main difference between the usage of these two is that for the initial fetch, you can specify all backend parameters separately, and filters like time window or host filtering, and you can also specify a config section in the site config file, to get those parameters from. If you specify a config, and also parameters in the command line, the parameters passed to the command will override the ones in the config. For real time fetching, you can only specify a config section. Refer to the command line help for further details. Here are some examples:

fetch using SOAP backend, specifying only a config section
$> fetch-initial-scb --config scb_soap
fetch like above, but with filters specified
$> fetch-initial-scb --config scb_soap --start-time 2014-11-01 --end-time 2015-01-31 --filter-
fetch using PgSQL backend, specifying a config section, but overriding database name to
$> fetch-initial-scb --config scb_pgsql --pgsql-dbname scb_111_anon Also note that despite it's name, real time fetching won't fetch data in a real time manner at the moment. If you want periodic fetching, you have to use an external tool to call the fetch command periodically, for example a cron job. There may be a crontab file in the doc/conf/ directory to serve as an example for such a job.

List Databases on a PostgreSQL Server:

For a list of available databases, do this:
bazsi@bzorp:~/zwa/projects/bsp-1.0/source/bsp$ psql -h hector.bsp.balabit -U scb template1
template1=#\l
(the list of postgresql databases follow)

Json Importer Addon

In an example, the easiest way to import activities logged by some custom software is, through the jsonimporter addon.

This addon reads activities from file, which contains an activity in every line in json format. (See the example below) The importer can be used from the bspcli.

Example:
./bspcli --site <example> import-json --file <activities.json>
Example JSON:

```
{
"type": "custom_activity",
"end_timestamp": 1414657518,
"start_timestamp": 1414657518,
"summary": "user active on host: host",
"details": {
"any": "thing",
"other": "thing",
"some_count": 10
},
"user_ref": {
"identity": {"origin": "feature", "account": "user"},
"email": "user@balabit.com"
},
"host_ref": {
"dns_name": "host",
"ip_address": "156.12.12.15"
},
}
```

Basically only fields should be defined, which are provided in the example. Your custom data should be in the details field and you should provide these new fields in algorithm configuration too.

The user_ref and host_ref dictionaries will be used to resolve, the mentioned user or host. Example supported fields are shown in the example.

Json User Fetcher Addon

This addon reads users from file, which contains a user in every line in json format. (See the example below) The json user fetcher can be used from the bspcli.

Example:
./bspcli --site <example> fetch-users --fetcher jsonuser --input <users.json>
Example JSON:

```
{
"identities": [{"origin": "feature", "account": "user"}],
"groups": [{"origin": "host", "group": "devel"}],
"emails": ["user@balabit.com"],
"attributes": {"test": "test"},
"risk": 47
}
```

Basically only fields should be defined, which are provided in the example. Your custom data should be in the attributes field.

Example supported fields are shown in the example.

Scoring

This can be done with the bspcli script.
Build Baseline

It builds baseline for users by algorithms in the given time range and save it in DB.

$ ./bspcli --site <customer> build-baseline --algorithm <example-algo> -- starttime 1970

Starttime, endtime and algorithm arguments are optional. If starttime, endtime are not set, config or algorithms default used for set the time window. If algorithm is not set, all algorithms will build baseline.

You can also specify the starttime and endtime arguments with hourly precision using the following date format: YYYY-MM-DD hh or YYYY-MM-DD hh:mm The default hour is 0, so 2014-12-01 would fall back to 2014-12-01 00.00.

$ ./bspcli --site <customer> build-baseline --algorithm <example-algo> -- starttime '1970-10

Activity Scoring

Scores activities by algorithms then aggregate these scores to a final score. Aggregation method can be modified by editing blindspotter.conf. (see: Configuration) Importance may be calculated from final score and user risk. Algo_details can store algorithm related data. Scores, final score (score), importance, algo_details are updated into the activity.

$ ./bspcli --site <customer> score-activities --algorithm <example-algo> -- starttime 1970-

Starttime, endtime arguments are required, but algorithm is optional. If algorithm is not set, all algorithms will score.

You can also specify the starttime and endtime arguments with hourly precision using the following date format: YYYY-MM-DD hh or YYYY-MM-DD hh:mm The default hour is 0, so 2014-12-01 would fall back to 2014-12-01 00.00.

$ ./bspcli --site <customer> build-baseline --algorithm <example-algo> -- starttime '1970

Continuous Activity Scoring

During the activity streaming process the activityingestion module creates a score for every single activity automatically. For now every algorithm processes the whole activity set, the config of the algorithm's instance has an effect on what kind of activities can be imported, till we can not cope with the filtering of the activities that are processable by the appropriate instance.

The activityingestion module is using the ActivityScoring service that first makes a score for every single algorithm instance and after that makes an aggregated score by scores of instances. Aggregation method can be modified by editing blindspotter.conf. (see: Configuration)

Entity Scoring

Scores entities (users and hosts) in time range and save as Importance in the entity. The importance of entity is calculated from average of top 50% of entity's activities ordered by importance.

$ ./bspcli --site <customer> score-entities --starttime 1970-10-10 --endtime 2020-10-10

The starttime and endtime arguments are optional, if not used the time_window parameter would be used from the config file under the entity_scoring section.

You can also specify the starttime and endtime arguments with hourly precision using the following date format: YYYY-MM-DD hh or YYYY-MM-DD hh:mm The default hour is 0, so 2014-12-01 would fall back to 2014-12-01 00.00.

$ ./bspcli --site <customer> build-baseline --algorithm <example-algo> --starttime '1970-10

Aggregate Score

It is not used in the scoring flow, because this aggregation is built in activity scoring, but this can be used to re-aggregate the activities final score (score) and importance. Aggregation method can be modified by editing blindspotter.conf. (see: Configuration)

$ ./bspcli --site <customer> build-baseline --algorithm <example-algo> --starttime '19

Starttime, endtime arguments are required.

You can also specify the starttime and endtime arguments with hourly precision using the following date format: YYYY-MM-DD hh or YYYY-MM-DD hh:mm The default hour is 0, so 2014-12-01 would fall back to 2014-12-01 0000.

$ ./bspcli --site <customer> aggregate-score --starttime 1970-10-10 --endtime 2020-10-10

PostgresDB
  Install on Ubuntu, in an example.
  install on the system (make sure your postgres version is at least 9.3)
    sudo apt-get install postgresql postgresql-contrib
How to Setup Database for Blindspotter
  Create a new role with correct permissions, set it's password (preferably to 'bsp'), and create a database for it

```
sudo -u postgres psql postgres
postgres=# create role bsp with CREATEDB LOGIN;
postgres=# \password bsp;
postgres=# create database bsp owner=bsp;
```

Examples of Log message IDs are given in FIG. 13.

Developer's Guide

Architecture

Figure 14:
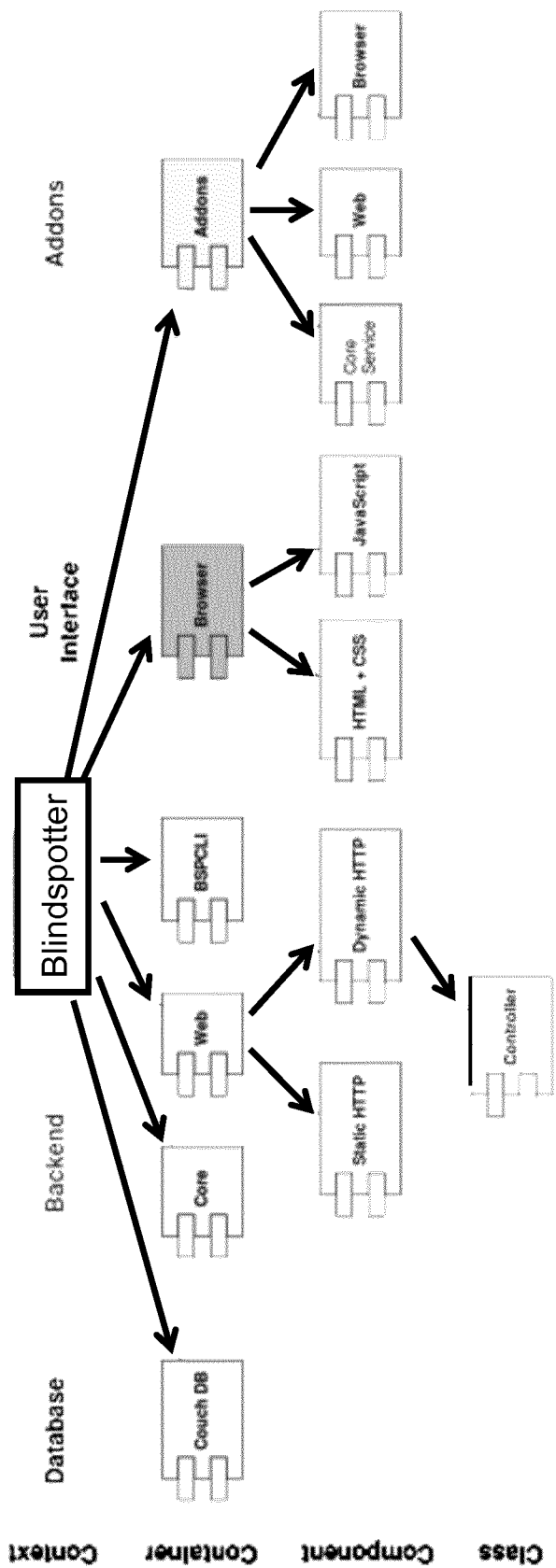
FIG. 14 shows an example of a high level diagram of an example architecture.

This page contains information on how the BSP application is architected, how its components interoperate in order to carry out its mission. This document is structured in a way that makes it easy to approach the system, starts at the Helicopter view, approaches individual execution units one-by-one and then concentrates on the components running inside those execution units. For a start, FIG. 14 shows an a high level diagram of an example architecture.

We are using the 4C nomenclature for this description, for which a short introduction in included in a subsequent chapter.

This is some of the most important intents behind the architecture:
  highly decoupled, making all dependencies of objects explicitly passed as constructor arguments
  centralize initialization code, instead of scattering constructor calls
  everywhere using an easy to use DI (Dependency Injection) system
  easily testable with unit tests, and allow fast integration/end-to-end testing
  easily extendable with addons, addons can encapsulate virtually any kind of functionality The 4C Nomenclature This architecture description uses the 4C model to denote various levels of abstraction. Each of these levels can be shown and described separately as we delve into architecture details.

For more information on the 4C model, please read the craft conference presentation:
  http://static.codingthearchitecture.com/presentations/craftconf2014-agility-and-the-essenceof-software-architecture.pdf
  And the video recording: http://www.ustream.tv/recorded/46743935

Here is a short definition of the 4 Cs that helps you understand this description even without watching the video/reading the pdf:
  Context: shows the context of the entire application, showing the system, its various actors and its effects to the outside world
  Container: is an execution unit, one that gets executed and has a role in the operation of the entire system. In a web application, the JavaScript running in the browser and the Web server is a separate container, and in a similar vein, the database running PL/SQL or map-reduce jobs is a separate container. Some containers behave like libraries, which provide code and services but cannot be executed on their own. Other containers have main partitions, which mean it can be executed and run.
  Component: a larger subsystem, consisting of an interoperation of a set of classes that carry out some kind of functionality to other components.
  Class: a class in the OOP sense, components are made up of classes In the 4C model, we usually document the first three levels, whereas we leave classes to document themselves.

Context

The context of an BSP application consists of:
  the users of the system that are assumed to be security analysts, working in an SOC (Security Operation Center)
  the operators of the system that ensure the proper deployment, integration and continuous operation of BSP
  the entire user population of the customer that are being monitored
  3rd party systems that host data that BSP uses for its analysis Containers This chapter contains the description of the containers (aka execution units) that BSP may be built on.

Library Containers:
  lib: contains reusable library code, that may be used anywhere outside BSP's context core: contains business logic and core services that are used by potentially all addons and all containers of BSP. Independent of the actual user interface (web, command line or otherwise). The definitions of the entities (e.g. users and hosts) we work with, the basic interfaces to retrieve and store these and the scheduling of data fetchers are belong here. On its own, core is not executable, it hosts services that the main partitions are using.

Containers that have Main Partitions:
  web: contains the main application for the server side part of BSP, e.g. this is where the HTTP serving is implemented
  bspcli: contains command line tools that get executed on the server side as a part of operation and setup
  browser: is the actual User Interface that the customer is using to access BSP services.
  login-ui: is the user interface for the central login application Persistency:
  database: The data as needed for BSP are stored in a persistency layer. The exact implementation of the database may be provided by an addon, however it is expected that our database implementation is able to host code that operates directly on the data locally, within the context of the database server.

Addons:
  addons: addons as their name suggest add functionality to BSP, an addon is able to augment BSP functionality in quite flexible ways, it can host code end-to-end, from database jobs, to backend tasks and services to components on the user interface.

Library Code (Lib/Directory)

The lib directory contains code that may actually be part of any other application. It may not have dependencies outside of the lib directory (except 3rd party libraries of course). Lib is not executable by itself, it contains implementations for services and classes that are expected to be used by the core and various applications.

Language: Python (Python is a widely used general-purpose, high-level programming language.)

Core (Core/Directory)
This is already BSP specific but still generic enough to be used by virtually all addons and/or all main programs (tools and the web backend).
Language: Python
Web Backend (Web/Directory)
The main application for the Web backend that provides REST based services to the frontend running in the browser. The web backend have 2 main partitions:
bspapp: the main BSP application
loginapp: the authentication app that takes care about logging in users
Language: Python
BSP Command Line Tool (Bspcli/ Directory)
This container contains an command line tool that provides administrative services to operators.
Language: Python
Browser
Angular One Page Application (OPA) that is the main user-interface for BSP.
Language: JavaScript
Login User Interface (Login-Ui/ Directory)
The user interface for loginapp, basically a login form.
Language: JavaScript
Database
We are storing our data in multiple potential database implementations (read further in Database chapter).
In an example, our primary production database will be PostgresDB, which is implemented in the bsp.addons.postgresdb addon.
PostgresDB is very good at handling json fields in the database, so we are able to store different activities in the database easily.
Language: Python (and sql queries)
Addons
Addons are used to implement most of the functionality of BSP, e.g. the core itself may be only a skeleton that allows the most basic services and loading of addons. Then, all features provided by BSP are actually implemented in addons.
These are the main use-cases for addons:
add functionality to an already existing extension point (e.g. register a regularly executing timer or provide a REST access to a resource by registering a route)
implement further extension points that other addons can add functionality to (e.g. the RESTful framework is defined by an addon, anything that wants to publish a RESTful resource registers there)
provide an implementation of an interface (e.g. pluggable persistency layer)
Database
BSP can operate on a number of persistency backends, where it stores entities (like users, hosts and activities) and other related data.
The core of BSP is modular, it doesn't depend on a specific database implementation, rather this functionality is provided by addons. This section tries to document the Database interface. Certain implementations may have additional peculiarities.
A database instance is automatically constructed for the execution of a Blindspotter context, it has the following high-level functionalities:
constructing entity specific DataRepository instances
accessing Database specific management operations (create, drop, etc)
running queries on the data stored in the database (in Blindspotter terms these are called Views)
class bsp.core.data.database.Database
create_database( )
drop_database( )
exists( )
get_activities( )
get_data_repo_by_id(entiy_id)
get_hosts( )
get_peer_groups( )
get_states( )
get_users( )
iter_data_repos( )
recreate_database( )
view(view)
Entity Objects
Entity objects are defined in the bsp.core.data package, namely in the users, hosts and activities modules.
Entities have the following properties:
they are data structures, all attributes are public
methods are not allowed (see an exception below)
they are immutable, which means they cannot be changed once created
they can host functions that create derived values from public attributes (in the form of properties)
they are derived from the bsp.lib.datastruct.DataStruct class, which ensures inmutability and provide common functionality required to serialize entities
Testing Strategy:
we test methods that produce derived data
we don't test the data structure itself (we test the base class, but not derived classes)
User Entity
class bsp.core.data.users.User(base=None, **kwatgs)
Class encapsulating a User entity
This class encapsulates a user entity within the application. It contains user specific attributes and can be stored in a bsp.core.data.datarepo.DataRepository.
cluster=−1
The ID of the main cluster
details={ }
List of name-value pairs that give additional details to the user. Each name-value pair is _optional_, thus any code that uses this field MUST BE PREPARED to deal with non-existing fields here.
display_name
The best known name for a user
emails=[]
Email addresses
groups=[]
Groups of the user with their origin {'origin': 'X', 'group': 'G'}
id=None
Unique ID
identities=[]
Account names with their origin {'origin': 'X', 'account'; 'A'}
importance=0
Importance of this user
name=u"
Name of the user
risk=99
The resultant risk value
risks={ }
Risk scoring details.
Peer Group Entity
class bsp.core.data.peergroups.PeerGroup(base=None, **kwvargs)
Class encapsulating a PeerGroup entity This class encapsulates a group of users within the application. It contains peer group specific attributes and can be stored in a bsp.core.data.datarepo.DataRepository.
> display_name
>> The best known name for a given peer group
> id=None
>> Unique ID
> name=u"
>> Peer group name
> type=u"
>> type of the peer group Host Entity
> class bsp.core.data.hosts.Host(base=None, **kwargs)
> Class encapsulating a Host entity
> This class encapsulates a user entity within the application. It contains host specific attributes and can be stored in a bsp.core.data.datarepo.DataRepository.
>> cluster=−1
>>> The ID of the main cluster.
>> display_name
>>> The best known name for a given host
>> dns_names=[]
>>> Registered DNS aliases
>> id=None
>>> Unique ID
>> importance=0
>>> Importance of this host
>> ip_addresses=[]
>>> Set of IP addresses
>> name=u"
>>> Primary hostname (optional)

Activity Entity
> class bsp.core.data.activities.Activity(base=None, **kwargs)
> Class encapsulating an Activity entity
> This class encapsulates an activity entity within the application. It contains host specific attributes and can be stored in a bsp.core.data.datarepo.DataRepository.
> The nature of the activity is encapsulated as the value of the type attribute. The possible set of activities is not closed, as connectors and algorithms may define the set they do understand. Common idioms are documented here:
>> session—interactive session
>> algo_details={ }
>>> List of algorithm specific name-value pairs
>> closed=False
>>> Whether the activity is closed
>> details={ }
>>> List of name-value pairs that give additional details to the activity. Each name-value pair is _optional_, thus any code that uses this field MUST BE PREPARED to deal with non-existing fields here.
>> end_timestamp=None
>>> The end of this activity or None (when it doesn't apply)
>> host={ }
>>> Host details of this activity
>> host_id=u"
>>> ID of the associated host object
>> id=None
>>> Unique Identifier
>> importance=0
>>> Importance of this activity
>> is_interesting=None
>>> The activity has been assessed
>> score=0
>>> The resultant score
>> scores={ }
>>> Scoring results by individual algorithms, the key identifies the algorithm, the value is the score assigned by that algorithm.
>> start_timestamp=0
>>> The start of this activity
>> summary=u"
>>> Short user readable description of the activity
>> type=u"
>>> The type of this activity (in an example, "session")
>> user={ }
>>> User details of this activity
>> user_id=u"
>>> ID of the associated user object DataStruct Class
> class bsp.lib.datastruct.DataStruct(base=None, **kwargs)
> DataStruct class to encapsulate data entities
> This class is to be used as the base class for entities (e.g. objects stored in the database). It is just like a plain-old-python-object, except that it is immutable (e.g. attributes can only be set through its constructor) and that it validates its attributes through attribute declarations in the class.
> In order to define the valid attributes, one has to create a descendant class, so this is an abstract base class.
> There are two classes of attributes:
>> those that start with an underscore: these are meant to be used by the entity gateway that created this object in the first place, stuff like CouchDB document IDs or revisions are to be stored here.
>> others: these are meant to be properties of the entity in question. These must be primitive types (numbers, strings, dicts and lists), and not objects. The datastruct is to be serialized in datastores and their serialization format must be plain old data.
> get(key, default=None)
>> Return the given attribute without raising an exception
>> Use this function to query attributes without the risk of raising an exception and optionally supplying a default value, it is similar to dict.get( )
> items( )
> keys( )
> to_dict( )
>> Return the DataStruct instance data in a dict DataRepository
> Entities can be stored in DataRepository instances, one for each entity type (e.g. there's one for users, hosts & activities). A DataRepository serves as a gateway between the application and the database.
> The DataRepository have the following functionalities:
>> getting a single entity by ID or getting all entities
>> adding, updating and removing (CRUD) entities
>> adding, removing and listing attachments associated with entities
> class bsp.core.data.datarepo.DataRepository(constrct_entity, id_prefix)
>> Abstract base class encapsulating entity access functions
>> This class serves as the abstract base class for storing and querying entity objects in various database backends. An entity is a, specialized, instance of DataStruct (e.g. bsp.core.data.users.User or bsp.core.data.hosts.Host)
>> add(entity)
>>> Add a new entity
>>> This function adds a new entity to the repository. The argument can have an optional "id" key, which is then used to save the entity. If no "id" is present one is automatically assigned.

The created entity is returned.
add_attachment(entity, filename, data, content_type)
add_bulk(entities)
Add a list of entities
This function adds a list of new entities to the repository. Entities can have explicit unique IDs simply by having an "id" key.
If adding any of the new entities fails, the function raises BulkAddFailed exception with a list of failing entities.
construct_entity=None
Factory function for constructing an entity (e.g. a DataStruct constructor)
create_id( )
delete(entity)
Delete an existing entity
The entity is required to have an id, otherwise the update raises EntityNotFound exception.
delete_all( )
Delete all entity
get(entiy_id)
Fetch an entity by its unique ID
get_all( )
Fetch all stored entities
get_attachment(entiy_id, filename)
get_count( )
Get number of stored entities
iter_attachments(entiy_id)
Return a the list of attachments as a sequence of pairs
This method returns a sequence of pairs, where each pair consists of (filename, content_type) for all stored attachments associated with the given entity.
update(entity)
Update an already existing entity
The entity is required to have an id, otherwise the update raises EntityWithoutAnId exception.
update_bulk(enmities)
Update a list of entities
This function updates a list of new entities to the repository.
If updating any of the new entities fails, the function raises BulkUpdateFailed exception with a list of failing entities.
The entities are required to have an id, otherwise it will be appended to the list of failing entities.
validate_id(_id)
Database Implementations
Database support is implemented in addons, the specific implementation is instantiated based on the database_type configuration item.
The following choices are implemented as of now:
PosgresDB—implements an SQL database, entities stored in PostgresDB
memdb—implements a fake, storing entities in memory
Database Views
Database implementations should implement all database views, which are defined in the activities, users and hosts module in the bsp.core.data module.
All view implementation should have implemented tests, which are defined in the bsp.core.data.tests folder in the activitiestestcase, userstestcase and hoststestcase modules. These testcases are abstract classes, which have the construct_database abstract method. Implementations can generate the concrete testcases by using the following method:
bsp.core.data.tests.build_view_integrationtests(construct_ database, dbname, slow=False)
Generic creation of ViewTestCase classes.

View implementations only available through addons, but our expectations to these views are described in the following modules, as TestCase classes:
bsp.core.data.tests.activitiestestcase
bsp.core.data.tests.userstestcase
bsp.core.data.tests.hoststestcase
These TestCases are abstract classes and their implementations should implement the construct_database method.
Instead of creating all ViewTestCase implementations you can use this method to generate them auto magically, by providing the construct_database method.
Example usage from bsp.addons.memdb.tests.test_memdb_views:

```
from .. import MemDatabase
from bsp.lib.di import Injector
from bsp.lib.factory import Factory
from bsp.core.data.tests import build_view_integrationtests
globals( ).update(
build_view_integrationtests(
construct_database=lambda: MemDatabase(Factory(Injector( ))),
dbname="MemDB"
)
)
```

Errors
Error handling is a tricky business, there are lot of subtle rules to follow, and failing to do everything properly makes diagnosing problems a lot more difficult.
This text is aimed at documenting our best example current practices with regards to errors as we generate and handle them within Blindspotter.
Target Audience
There are three major audiences for our error messages:
1. the system engineers deploying and operating Blindspotter
2. our support team and
3. the developers
The aim of error messages is to make it possible to identify issues in the environment and/or within Blindspotter itself.
If reading an error message requires any of the following, we've failed:
1. checking out the source code
2. starting a debugger and/or adding print statements to get additional context
If we don't understand an error message in a whim, it's highly likely that our customers will not either.
Error Channels
Errors are conveyed to the users of the software using different channels, and the different channels have different level of detail.
The exact nature how we use these channels are different, this section aims at documenting how we handle the different cases.
Errors on the Console
This is the most condensed format and will be read by operators of our customers and system engineers deploying Blindspotter. Errors here should not contain information about code, but it should carry enough context to direct our focus to the actual issue at hand.
Our command line tool bspcli, writes the type of the exception and exception text to the console and at the ERROR log level.
The exception chain is only logged to the console if explicitly requested by the user using the -debug and log-to-console command line switches.

Some examples:
"Error connecting to CouchDB at http://localhost:5984"
"Algorithm foobar does not exist"
Typical mistakes:
too much details
code location which raised the error->should be only in the debug log
traceback->also debug log
information scattered in multiple independent error messages->we should make an effort to create a concise error message
too little details—missing filename, server location, whatever it takes to understand the context of the error
Errors on the REST Interface and the Web UI
We use a generic error message in this case and decidedly NOT include error details as they may contain security related information that we don't want to leak.
We can (and should) display a reference to our detailed log though.
Errors in the Log
The logs can handle more detail, but for now we do the same as on the console, the fact of the error with the type & text information at ERROR, the traceback information at DEBUG.
The debug log is read by developers and support engineers in most cases, but from time-to-time even end users may enable debugging to troubleshoot more involved problems.
The debug log should contain all information that can help pinpointing the issue without the need of another reproduction.
The debug log should still be easily digestable, as it makes the job of the support department and even ourselves much easier.
Exception Chaining
To ensure that information is recorded for errors, we are using an exception chaining, modelled after Python3's exception chaining (http://legacy.python.org/dev/peps/pep-3134/). Our implementation only works if the exception class is derived from bsp.lib.exception.ChainableException, so it doesn't work for builtin exceptions. We get that only if we migrate to Python3.
class bsp.lib.exception.ChainableException(*args, **kwargs)
root_cause
Exception chaining automatically records cause->consequence relationships in exceptions and makes it possible to display the entire chain.
We only write the exception chain into our debug log, so normally it is not seen by the user.
Throwing Errors
In all cases, all error paths should raise a concrete exception class, that is closely associated with the error path. So as a rule of thumb, all exception classes will be raised only once.
In a lot of cases, we throw errors based on other errors, that we caught using a try/except block. This makes sense in a lot of cases, but see the section about "translating errors" below.
Error text should be created so that it can be identified what went wrong. Here's a typical list that should be included:
File system errors (permissions problems, missing directories, files): filename, path
socket related errors (TCP communication): host, port, ip addresses
database related errors: database endpoint, table name, etc Rationales:
error cases must be programmatically identifyable using try/except blocks
we should never need to parse error messages
Exception Text
The texts of our own exceptions should contain enough information to stand on their own feet to explain what happened, even without the name of the exception class!
For instance, Python throws a KeyError if a dict does not contain a key, however the textual representation of the exception only contains the missing key:

```
try:
    { }['fooobar']
except KeyError as exc:
    print str(exc)
```

This results in the output: 'foobar', e.g. the repr of the key, and it doesn't include KeyError as a string.
In our own exceptions however, we should include all information to identify as the source of the error. If the exception type is relevant, that too.
Default error handlers use str(exc) to be printed as the sole explanation of the error, so it should capture all the relevant information.
Translating Errors
Error translation happens when we convert a low level error to a higher level error that it captures more context.
Here's why we do this:
the original error is not informative enough (e.g. KeyError or other Python builtin)
when we call out to an external component and it is not easy to know what kind of exceptions might be raised by the external component (e.g. when the external component may raise anything from socket.error to KeyError and its own set of exceptions, like the CouchDB client library does)
When we translate errors, we should make an attempt to include relevant information in the translation that makes it possible to understand the higher level error. Sometimes, we may not even rely on the library we are using to do that properly. I've seen cases when all I got was an socket.error without any identifyable information that would relate this to a higher level abstraction.
Sometimes it is the easiest to include information from the exception that caused our error handling.
When you decide to add information on the caught exception, the following may be enough:
name of the caught exception class
text of the caught exception
When you do include the text, you should be careful though, packing a series of exception text into a single line of error message is not trivial to decipher.
In an example, including exception text into a higher level exception should never be the default, we should only do that when we decided to do so.
When an exception may happen in a lot of different cases (e.g. generic error shielding an entire external component), the need for the chained exception text is higher. With more concrete exceptions, this need is lower.
Suppressing Errors
Sometimes errors are not really fatal and is part of the normal operation of the program. In such cases we are free to suppress exceptions.
In the other hand we should never ever suppress all exceptions by using a pokemon handler.

```
try:
    ...
except:
    pass
```

NOTE: just in case you didn't know, the unqualified except clause without an Exception class captures things like sys.exit( ) calls or SyntaxErrors, which you probably didn't want! So always include at least the base exception class "Exception" in the except clause.

Marking Root Causes

The chainable Exception machinery built into Blindspotter allows selective marking of exceptions as root causes.

A root cause within the exception chain is assumed to be the most relevant error that the user would be interested in when troubleshooting the issue.

The rationale behind defining a "root_cause" explicitly is that there's really no automatic way to determine which is the most important exception, given a long chain of exceptions thrown, and displaying the entire chain is not always possible (think of a UNIX command line tool, that displays the diagnosis of an error in a single line).

The root cause is often the first exception thrown that causes subsequent exceptions to be thrown, chained together. Sometimes however, the initial exception lacks context.

Example:
the initial exception is a KeyError
which in turn is translated to an AlgorithmNotFound exception
which in turn causes an application startup to fail In this case, the operator is primarily interested in the AlgorithmNotFound exception details, KeyError is too close to the program code, application startup is too generic. He can see that after all by the mere fact that the application displayed an error and returned a non-zero exit code.

In this case AlgorithmNotFound is marked as the root_cause at the throw statement. Rules of thumb about marking exceptions as root causes:

initial exceptions don't need this mark, those are the default root causes if nothing else is marked
errors that translate low-level and/or Python exceptions, which in turn add context to make the error easier to understand should be marked root_causes
AlgorithmNotFound that we throw instead of a KeyError
errors that translate errors of external components, where we can include all the required details should be root causes
DatabaseError that contains the low level error string are much better than the entire variety of exceptions potentially thrown by a database implementation
generic errors that may happen for a lot of reasons and when we can't include all information in them should not be root causes, the underlying error should be instead:
AddonError that encapsulates _all_errors triggered by addons
StartupError that encapsulates all kind of startup errors Which ones to mark as root causes is not always a clear cut decisions, the best guard here is to try to understand the problem of Blindspotter, merely by looking at the root-cause error message. If it captures the problem pretty well, we are fine. If it doesn't we can probably improve things.

Handling Errors

By handling errors I mean the spots where we do not reraise them, but rather make a final call what should happen. I call these the "default" exception handlers, sometimes people call this the handler for unhandled exceptions.

These spots are in most cases in the main partition of our application, around the main loop or similar construct.

There should be a limited number of these spots, maybe not just one, but definitely less than a handful.

When handling an exception we should make our best to communicate the exception type & text to the user (but not the traceback), as described in section Error channels above.

We don't need to flag these error messages any special or mark them with an elevated severity. It is true that these are unhandled exceptions, but them being unhandled has really no meaning to the user and can even be frightening, especially when associated with a high severity code.

Most applications display error messages when something goes wrong, but displaying a nasty "Unhandled exception: XXXX" perhaps together with a traceback is really frightening, even though if all what happened is a missing file.

Conventions

Example of browser structure rules:
filename must contain only lower case characters
the name of every js file that contains module definition
    must not contain space ( ), dash (-), underscore (_) or other non word character
every other is component filename
    must contain exactly one dash (-)
    must start with module name as a prefix
every test related file
    must be under 'tests' directory An example directory structure is shown in FIG. 15.

Services for Addons

JSBundle

For using jsbundle at BSP we should keep some rules when we are structuring the browser part (front end) to be able to do jsbundle automatically. Jsbundle depends on rules of browser structure so registering directory will use that set of conventions implicitly.

In an example, some of the bower components are associated with lack of conventions, and unnecessary or redundant files, so in case of bower components we must register all js files manually.

If you want to register your angular module as dependency into our application then you may use register_module_dependency function.

js_bundle_provider.register_module_dependency('loginTime')

Sections

Sections are specific areas on the user interface where you can register content you want to present, from your javascirpt module. The content is usually a directive, which can hold attributes.

Register Section

@dependencies(('SectionRegistryProvider'))
def config_in_web(section_controller_provider):
    section_controller_provider.register_section('section')

Register Addon Content to Section

If you want to use section specific data then you have to add the properly named attribute that will be exported by the section. You can access attributes provided by a section via the scope variables. You can see the list of exported variables at description of sections.

section_controller_provider.register_content_into_section('section', 'template_title'

Available Sections
 UserBaseline
  It appears on user page.
  Section name: user_baseline
  Importable variable by your angular module (exported by user_baseline section): user
   Available attributes of user object:
    user.id=User Unique ID
    user.name=Name of the user
 ActivityVisualization
  It appears on activity page.
  Section name: activity_visualization
  Importable variable by your angular module (exported by activity_visualization section): user, activity
   Available attributes of user object:
    user.id=Activity Unique ID
    user.start_timestamp=The start unix timestamp of the activity
    user.details.session_start_wday_ind=Day type indicator of the activity (1—weekday, 0—weekend)
Static
 You can register the static files of your addon.

```
register static files under browser directory
    @dependencies(('StaticRegistryProvider'))
    def config_in_web(static_controller_provider):
    static_controller_provider.register_static_dir('myaddon',
    get_file_relative_path
    bsp/addons/myaddon/
    !"" browser //your registered directory
    # $"" baseline
    # $"" mystaticfile.html
    !"" __init__.py
    $"" tests
    ...
you can reach your resources from static/myaddon/
    curl
    localhost:8080/example/static/myaddon/baseline/mystaticfile.html
    --user
    user:pass
```

WebREST
 You can register the rest controller of your addon.

```
        class RESTExampleController(object):
        @json_out
        @route("/{id}/item")
        def get(self, id):
        return id
        @dependencies(('WebREST'))
        def setup_in_web(web_rest):
        web_rest.register_rest_controller("/myresource",
        RESTExampleController( ))
```

Importing Activities
 Custom Importer Addons should use ActivityIngestion service to add data to the Blindspotter.
  class bsp.core.activityingestion.ActivityIngestion(activity_repository, user_repository, host_repository, database, activity_scoring)
   This service should be used to send activities to the database.
   ingest(activity_data_list, skip_errors=False, score=True)
   Ingest a bunch of activities.
   The input of the activity_data_list should be a list of dicts and a dict should be like the input of the jsonimporter addon.
   update_activities(activities_update_data, score=False)

Tools
Logtool
 The logtool can be used to automatically assign a unique_id to log messages in new production code, generate a skeleton for log descriptions, and generate an rst documentation out of those descriptions. It can be found in the scripts directory.
Working with Logtool
 The basic workflow with logtool is writing the log messages in the code, replacing the unique ids, writing the description for it, and generating the documentation. Here we outline the basic workflow, but feel free to refer to the internal help of the tool for further features.
 Write your log message into the code, but don't provide a valid unique_id just yet, just put AUTOID instead.
  logger.error(logger.AUTOID, "Error occured", errorcode=errorcode)
 Then use the logtool to replace all occurances of AUTOID with valid unique ids. Run the replace command, supplying a directory to look for occurrences in.
  ./logtool -p ../bsp replace
 This will patch all files concerned. The example above would look like this after the patch:
  logger.error(logger.LogID(_name_, 1), "Error occured", errorcode=errorcode)
 The replace command also automatically generates a skeleton in the doc/logmessages. yaml file. You can edit it manually to write the descriptions of the log messages. After the yaml file has been modified, an rst documentation can be generated out of it, like so:
  ./logtool -p ../bsp report -o ../doc/log-messages.rst
Makedist
 Makedist is a simple script which can make a release tarball, and put it into the dist directory. Normally, it is only used by the release generator jenkins job, but it also can be used locally.
Internals
 The makedist script does the following:
  runs a setup.py install which will put the package contents in the install/ directory
   setup.py will gather all python modules (excluding tests), pictures, javascript sources, html and css files, etc.
   it will also gather all bower dependencies (excluding components which are only needed for development)
   setup will generate and place the executables (bspweb and bspcli), and put them into the bin/ directory
  gets the contents of the release itself, by listing the names and versions of all dependencies (pip, bower, npm), and putting them into separate files under the package_contents directory
  copies the whole environment into the /opt directory using the virtualenv-clone script. This script will alter all the shebang lines too, to make sure the executables will be runnable after the relocation. This is the reason the release will only work if it is extracted into the /opt directory
  takes the copied environment, removes all unneeded files, then copies the example config files to the proper place
  makes a compressed archive of the whole environment, and places it in the dist/directory
  runs setup.py bdist_egg which will make an EGG file (file format: a compressed archive file format used in computers), which is a python egg, for the bsp package, and also places is in the dist/ directory Using Makedist Simply run the script, it will remove any previous releases, copy the needed files into the install directory, create the release tarball, and put the archive into the dist directory.

./Makedist

Once you have the archive, you need to extract it into the /opt directory, and you will be able to run blindspotter using the bsparb executable in the /bin directory, and can also use bspcli. An example configuration is included in the tarball, so it can be used right away (site name is example, username is user, password is titkos) but in order to use it properly, you need to configure your own site, and add a user to the passwd file.

Prerequisites

Make sure that the product is correctly bootstrapped, so there is an install directory in the project dir, and that the virtualenv-clone executable is available under install/bin (which is the case if the bootstrap was successful). Also make sure that you run the script from inside it's own directory, and the user running the script is in the sudoers file.

Activity Data Flow

Figure 16:
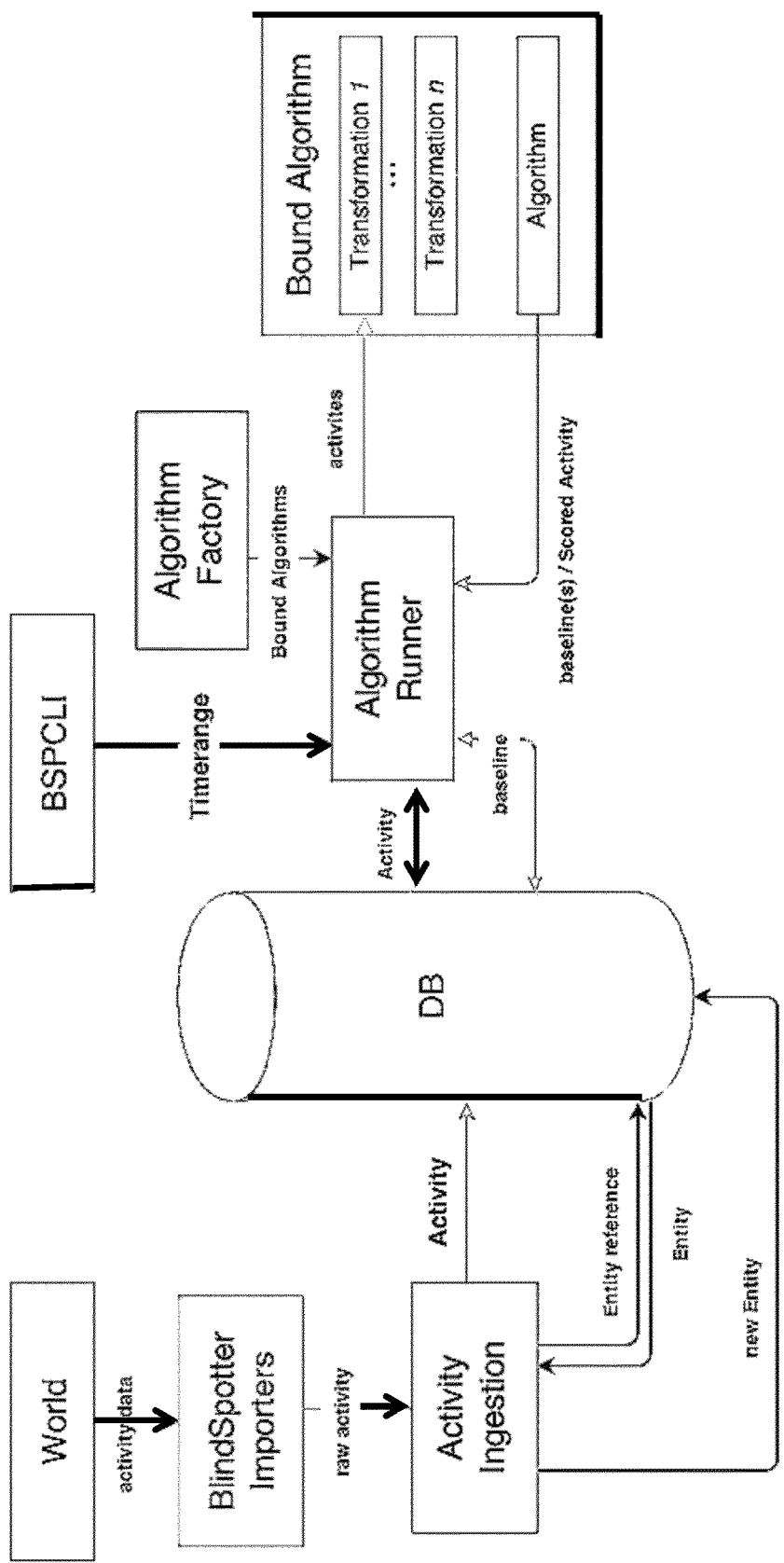
FIG. 16 shows an example of main system components.

This section describes how the activities get into the algorithms and how we save the result. FIG. 16 shows an example of main system components and you can see some implementation and configuration example details below.

Component Documentations class bsp.core.activityingestion.ActivityIngestion(activity_repository, user_repository, host_repository, database, activity_scoring)

This service should be used to send activities to the database.

ingest(activity_data_list, skip_errors=False, score=True)

Ingest a bunch of activities.

The input of the activity_data_list should be a list of dicts and a dict should be like the input of the jsonimporter addon.

update_activities(activities_update_data, score=False)

class bsp.core.algo.dftransformfactory.Transformation(param, in_operation=None)

Base class for the DataframeTransformations in_operation

The algorithm operation where it should be runned, it is 'all' by default.

transform(source_data)

Returns new dataframe, may mutate source_data.

Algorithm related components are documented in Algorithms chapter.

Running Algorithms

There is 2 service for the 2 method for the Algorithms, both of them can run the all algorithm at once or just one if it is provided.

class bsp.core.activityscoring.ActivityScoring(algorithm_ factory, activity_score_aggregator)

score(activities, algorithm_selector=None, progress_reporter=None)

Score activities in timerange. Parameters:

activities—The activities that should be scored.

algorithm_selector—Will be run only the given algorithm if it is provided or it runs all algorithm.

class bsp.core.baselinebuilder.BaselineBuilder(algorithm_factory, database, baseline_repository)

build(timerange=None, algorithm_selector=None, progress_reporter=None)

Build baseline for the algorithms. Parameters:

timerange—This timerange will be used to query the database for the activities algorithm_selector—Will be run only the given algorithm if it is provided or it runs all algorithm.

progress_reporter—The reporter object that can measure and display the progress of baseline building.

Algorithm Configuration

This example shows the possible fields in a bound algorithm configuration.

```
[algo: logintime]
relevant_columns: ['start_timestamp']
pipeline.transforms: [
{'name': 'remove_small_user', 'param': 30, 'in': 'baselinebuild'},
{'name': 'calc_starttime_hours', 'param': {'timezone': 'UTC+2',
'timestamp_field'
]
algorithm: 'kerneldensity'
algorithm.target_column: 'starttime_hours'
```

The 'pipeline.transforms' should be a list of transformations, where a transformation has a name, one param and optionally an algorithm operation. It can be defined with the 'dataframe_transformation' decorator and should be derived from the Transformation class.

The 'algorithm' field is the name of the core algorithm, in this example it expects a keywordargument named 'target_column'. It can be defined with the 'algorithm_implementation' decorator.

In this example the bound algorithm named logintime will be do the following:

get all the activities with 'start_timestamp' field

Transformations:

in baselinebuild it will drop the small users, which has not have at least 30 activities calculate the new column named 'starttime_hours' run 'kerneldensity' on the starttime_hours column

Fetchers

This section describes the fetchers inside Blindspotter. Fetchers are software entities responsible for periodically getting data from various data sources, and feeding it into Blindspotter's dataflow model, enabling it to do it's analytics.

SCB Fetcher

Figure 17:
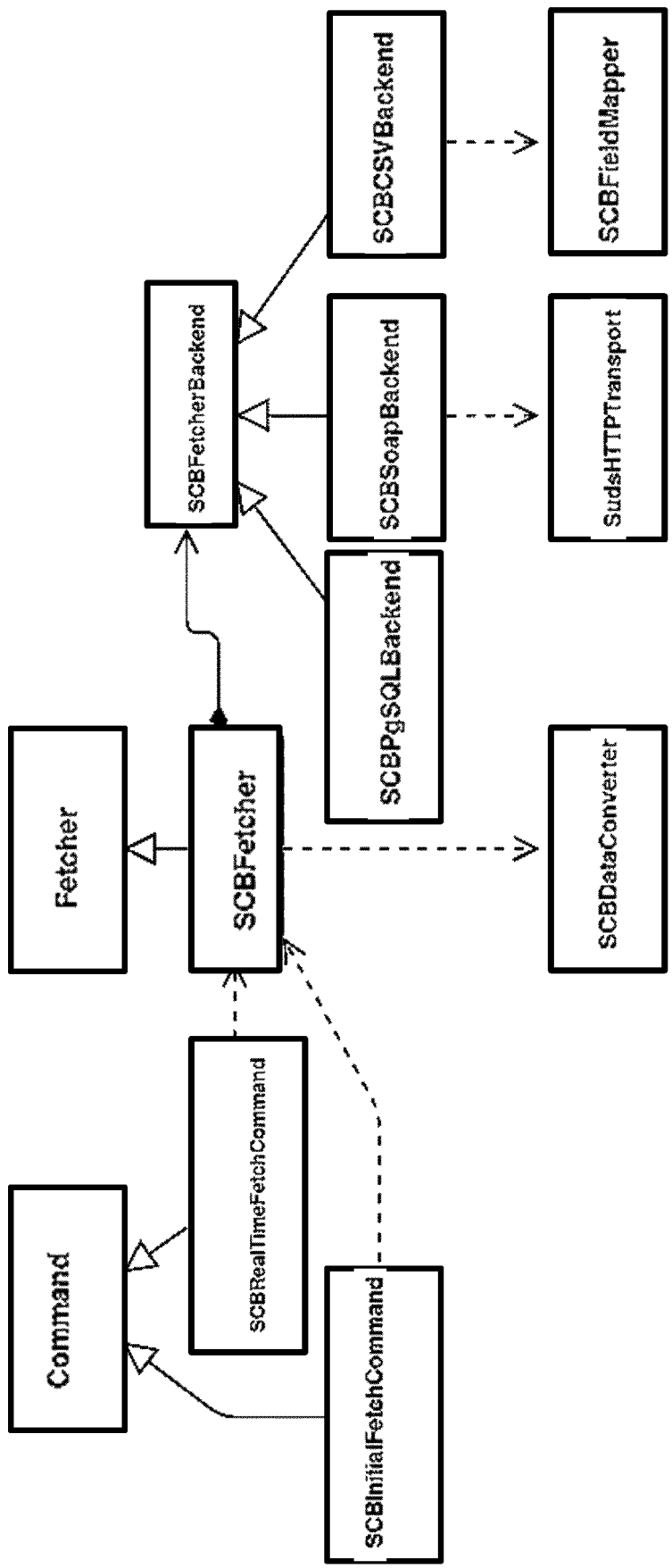
FIG. 17 shows an example of an overview of a SCB fetcher architecture.
Figure 18:
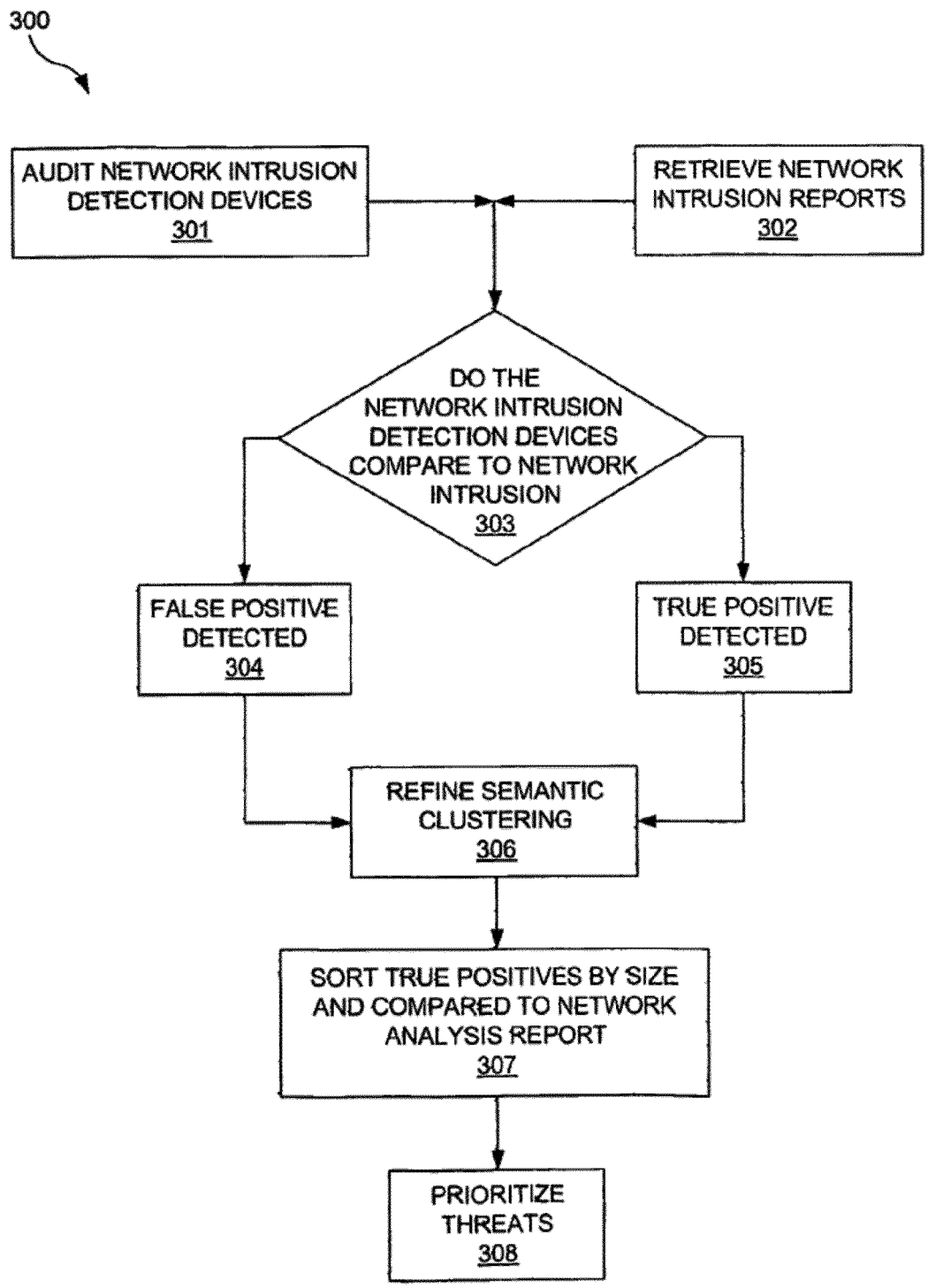
FIG. 18, in which the reference numeral 300 generally designates a flow chart depicting a prior art method of distinguishing relevant security threats, in step 301, the network intrusion detection devices are audited, in step 302, the network intrusion reports are retrieved, in step 303, 304, and 305, the network intrusion report and the threat assessment are compared, and in steps 306, 307, and 308, the semantic clustering is refined.

The SCB fetcher uses Shell Control Box as it's data source. In an example, there are two commands in the BSCLI tool to use this fetcher, one for an initial fetch, and another for real time fetching. The latter will only fetch newly generated data. The SCB fetcher can use three different backends to get data from the SCB. Another important part of the architecture is the SCB Data Converter, which can convert the data got from SCB into a format which can be used by BSP's activity ingestion. An example of an overview of a SCB fetcher architecture is shown in FIG. 17, which is a Unified Modeling Language (UML) diagram.

Backend Model

The backend model for fetchers enables polymorphic usage of different backends for the same data source. In an example, the SCB fetcher has three backends, namely the CSV, PgSQL and SOAP, and all of these are configurable separately. This model should be followed in the architecture of other fetchers too.

Algorithms

An algorithm encapsulates some kind of mathematic model that can be trained using a history of activities. Based on this training, the same algorithm can associate scores with real-time activities as they are received and ingested by the system.

Algorithm Class class bsp.core.algo.Algorithm(config=None)

Encapsulates a model that associates scores to algorithms

This class represents a—usually—mathematically sound model, that gets trained on a batch of past activities. The training data is then saved as the "baseline". Based on the "baseline", incoming activities can be scored, how much they reflect the training period.

DEFAULT_BASELINE_THRESHOLD=50
DEFAULT_TIME_WINDOW='3w'
runnable_on_groups

If returns true the algorithm will not get the whole database in a dataframe, only the activities for one entity and the train should return one baseline.

If returns false the algorithm will get all the activities in train and it should return a dict with entities in keys and baselines as values.

Default value is False score(activities, baseline)

The baseline will be the result of the train, if the algorithm is runnable on groups, else it's a BaselineRepository object.

The return value should be a dataframe with a score column and every other column will be saved in the algo_details field of the Activity. The index of the result will be used to add the scores to the Activity Entities.

train(entity_id, activities)

Build baseline(s) for the input data.

The output is a sequence of (entitiy_id, baseline) pairs

BoundAlgorithm Class class bsp.core.algo.boundalgorithm.BoundAlgorithm (name, algorithm, transformations, config, activity_repository, baseline_repository, database)

Encapsulates a properly configured Algorithm instance

This class reads the algorithm instance configuration from the config file and couples that with the generic algorithm object. It controls most algorithm instance specific operations, like training, scoring and basically stuff that requires knowledge about the algorithm config.

Although it controls training and scoring, it is not and is not meant to be compatible with a low-level Algorithm class. While a low-level algorithm class knows how to train a model, it has no knowledge where the data comes from or where the results are stored.

An object of this class is normally instantiated using a bsp.core.algo.AlgorithmFactory.

baseline_threshold
The baseline threshold of bound algorithm
runnable_on_groups
Property from algorithm
score(activities)
time_window
The baseline window of bound algorithm
train(timerange, progress_reporter)
train_from_activities(entity_id, activities)
Should get activities and returns baseline(s)

AlgorithmFactory class bsp.core.algo.algorithmfactory.AlgorithmFactory (config, factory, dataframe_transformation_factory)
instantiate(bound_algorithm_name)
instantiate_algos(algorithm_selector=None)

Notes

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

In the above discussion, numerous specific details have been set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signalling techniques, and the like, have been omitted, inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In an example, however, the functions are performed by a processor such as a computer or an electronic data processor in accordance with code such as computer program code, software, and/or integrated circuits that are coded to perform such functions, unless indicated otherwise.

The invention claimed is:

1. A computer-implemented method for determining computer system security threats, the method comprising:
for a plurality of user accounts, assigning a risk level to each account of the plurality of user accounts;
in a time interval, for a plurality of events, applying a set of at least two different algorithms to all of the plurality of events, wherein each event is linked to a respective user account, wherein each of the at least two different algorithms is applied to all of the plurality of events and assigning an event score for each of the plurality of events relating to deviation from a normal behavior associated with each said event of the plurality of events with respect to the respective user account and based on the outcome of each of the at least two different algorithms;
in the time interval, for each event of the plurality of events, calculating an event importance which is a function of the respective event score and the respective user account risk level;
prioritizing each event of the plurality of events by the respective event importance; providing a record of each event of the plurality of events, prioritized by the respective event importance;
providing, via a user interface, each event of the plurality of events in a user interface element, wherein the plurality of events are presented via the user interface in an order of decreasing event importance;
responsive to receiving additional data, updating an event importance for a particular event of the plurality of events; and updating the user interface to reflect the updated event importance for the particular event of the plurality of events;

analyzing application logs and other sources to find anomalies and suspicious activity;

automatically disabling a user account in response when an anomaly is detected; and starting session recording as an automatic response when an anomaly is detected.

2. The method of claim 1, wherein user behavior profiles are created and are continually adjusted using machine learning.

3. The method of claim 1, further comprising providing a web-based user interface in which activities, hosts, and user accounts may be checked and in which results are made available.

4. The method of claim 1, further comprising presenting a user interface in which (a) events are presented and ranked by their security risk importance, or (b) the plurality of user accounts are presented and ranked by their highest event security risk importance.

5. The method of claim 1, further comprising presenting a user interface in which remote IP addresses are presented and ranked by their highest event security risk importance.

6. The method of claim 1, further comprising presenting histograms, distributions, baseline visualisation for peer groups and for an entire company based on typical behavior.

7. The method of claim 1, further comprising building a unique profile of individual users with cooperation of a Shell Control Box (SCB) which records all user activity at an application layer.

8. The method of claim 7 in which the SCB has information on user sessions and meta information on connections and details of user activities in the user sessions.

9. The method of claim 1, wherein data may be accessed using a Representational State Transfer (REST) application programming interface (API) for integration into existing monitoring infrastructure.

10. The method of claim 1, wherein the system gets data from other systems including logs, audit-trails, and information on user activities.

11. The method of claim 1, including the system using at least two data sources, including contextual information sources and raw user activity data sources, wherein contextual information sources are one or more of: information on users, hosts, but not actual activities, or wherein contextual information sources are one or more of: Active Directory (AD), Lightweight Directory Access Protocol (LDAP), human resources (HR)-system, IT-asset database (DB), and wherein raw user activity data sources include one or more of: logs, SSB/syslog-ng/SIEM logs, SCB logs, databases logs, csv files logs, and application data through application programming interfaces.

12. A system including a hardware processor, the hardware processor programmed to execute a computer-implemented method for determining computer system security threats, wherein data relating to the user accounts is accessible to the hardware processor, the hardware processor programmed to perform operations comprising:

for a plurality of user accounts, assigning a risk level to each account of the plurality of user accounts;

in a time interval, for a plurality of events, applying a set of at least two different algorithms to all of the plurality of events, wherein each event is linked to a respective user account, wherein each of the at least two different algorithms is applied to all of the plurality of events and assigning an event score for each of the plurality of events relating to deviation from a normal behavior associated with each said event of the plurality of events with respect to the respective user account and based on the outcome of each of the at least two different algorithms;

in the time interval, for each event of the plurality of events, calculating an event importance which is a function of the respective event score and the respective user account risk level;

prioritizing each event of the plurality of events by the respective event importance;

providing a record of each event of the plurality of events, prioritized by the respective event importance;

providing, via a user interface, each event of the plurality of events in a user interface element, wherein the plurality of events are presented via the user interface in an order of decreasing event importance;

responsive to receiving additional data, updating an event importance for a particular event of the plurality of events; and updating the user interface to reflect the updated event importance for the particular event of the plurality of events;

analyzing application logs and other sources to find anomalies and suspicious activity;

automatically disabling a user account in response when an anomaly is detected; and starting session recording as an automatic response when an anomaly is detected.

13. The system of claim 12, wherein the system is provided as a platform product.

14. The system of claim 12, wherein the system provides a command line interface for managing system installation and running maintenance jobs.

15. The system of claim 12, wherein Behavior Analysis as a Service (BaaaS) is provided, wherein cloud offering of the system is provided for customers who do not want to use an on-premise installation.

16. The system of claim 15, wherein through cloud integration the system is usable to compare user activities and analytics with other organizations baselines.

17. The system of claim 16, wherein shared information includes one or more of: user risk histogram, algorithm parameters, algorithm weights, activity numbers, average baseline, baseline outliers, min/max/average/stddev score given by each of the at least two algorithms/baselines, false-negative activities with baselines, anonymous clusters.

18. The system of any of claim 12, wherein one installation of the system can serve multiple customers, wherein database, configuration, and user interface are all separated between instances.

19. The system of any of claim 12, wherein the system is installed on a Linux system, including database servers, web-server, Initial data import, and automatic job setup.

20. The system of any of claim 12, wherein the system can load historical data from data sources.

21. A non-transitory computer readable storage medium executable by a processor to cause a system to perform operations for determining computer system security threats, the operations comprising:

for a plurality of user accounts, assigning a risk level to each account of the plurality of user accounts;

in a time interval, for a plurality of events, applying a set of at least two different algorithms to all of the plurality of events, wherein each event is linked to a respective user account, wherein each of the at least two different algorithms is applied to all of the plurality of events and assigning an event score for each of the plurality of events relating to deviation from a normal behavior associated with each said event of the plurality of events with respect to the respective user account and based on the outcome of each of the at least two different algorithms;

in the time interval, for each event of the plurality of events, calculating an event importance which is a function of the respective event score and the respective user account risk level;

prioritizing each event of the plurality of events by the respective event importance;

providing a record of each event of the plurality of events, prioritized by the respective event importance;

providing, via a user interface, each event of the plurality of events in a user interface element, wherein the plurality of events are presented via the user interface in an order of decreasing event importance;

responsive to receiving additional data, updating an event importance for a particular event of the plurality of events; and updating the user interface to reflect the updated event importance for the particular event of the plurality of events;

analyzing application logs and other sources to find anomalies and suspicious activity;

automatically disabling a user account in response when an anomaly is detected; and starting session recording as an automatic response when an anomaly is detected.

* * * * *